US008081614B2

(12) United States Patent
Endoh

(10) Patent No.: US 8,081,614 B2
(45) Date of Patent: Dec. 20, 2011

(54) VOICE TRANSMISSION APPARATUS

(75) Inventor: Takashi Endoh, Yokohama (JP)

(73) Assignee: Kyocera Corporation, Kyoto (JP)

( * ) Notice: Subject to any disclaimer, the term of this patent is extended or adjusted under 35 U.S.C. 154(b) by 198 days.

(21) Appl. No.: 12/443,457

(22) PCT Filed: Sep. 27, 2007

(86) PCT No.: PCT/JP2007/068883
§ 371 (c)(1),
(2), (4) Date: Dec. 7, 2009

(87) PCT Pub. No.: WO2008/047560
PCT Pub. Date: Apr. 24, 2008

(65) Prior Publication Data
US 2010/0091748 A1    Apr. 15, 2010

(30) Foreign Application Priority Data
Sep. 28, 2006  (JP) .................. 2006-264847

(51) Int. Cl.
*H04W 4/00* (2009.01)
(52) U.S. Cl. ................ 370/338; 704/201; 709/232
(58) Field of Classification Search .................. None
See application file for complete search history.

(56) References Cited

U.S. PATENT DOCUMENTS

| 6,914,883 | B2 * | 7/2005 | Dharanikota | 370/230.1 |
| 6,950,393 | B1 * | 9/2005 | Ben Nun et al. | 370/229 |
| 7,200,113 | B2 * | 4/2007 | Beyda et al. | 370/231 |
| 7,349,330 | B1 * | 3/2008 | Hayakawa et al. | 370/229 |
| 7,567,508 | B2 * | 7/2009 | Charny et al. | 370/229 |
| 7,701,980 | B1 * | 4/2010 | Bugenhagen | 370/516 |
| 7,715,827 | B2 * | 5/2010 | Yoo | 455/412.1 |
| 7,903,776 | B2 * | 3/2011 | Ishida et al. | 375/371 |
| 2001/0014100 | A1 * | 8/2001 | Abe et al. | 370/412 |
| 2002/0026310 | A1 * | 2/2002 | Mochida et al. | 704/201 |
| 2004/0030797 | A1 * | 2/2004 | Akinlar et al. | 709/232 |
| 2004/0085963 | A1 * | 5/2004 | Ying | 370/394 |

(Continued)

FOREIGN PATENT DOCUMENTS
EP        1931068 A1 *  6/2008
(Continued)

OTHER PUBLICATIONS

International Search Report for corresponding PCT application PCT/JP2007/068883 lists the references above.

(Continued)

*Primary Examiner* — Bunjob Jaroenchonwanit
(74) *Attorney, Agent, or Firm* — DLA Piper LLP (US)

(57) ABSTRACT

A voice transmission apparatus includes a jitter absorbing buffer unit provided in the receiving unit and which absorbs a transmission delay in the packets, and a transmission wait control unit provided in a transmitting unit and which links a packet to be transmitted when transmission temporarily breaks down to a queue. A transmission wait control unit 15 includes an accumulated time computing unit 18 that computes the accumulated time of voice data in packets linked to a queue 19. The transmission wait control unit 15 extracts an oldest linked packet from the queue 19 and discards the same so that the accumulated time computed by the accumulated time computing unit 18 becomes equal to or less than a threshold in order to continuously link a new packet to the queue 19, thereby equalizing the threshold to an accumulation time of a jitter absorbing buffer unit 21.

3 Claims, 15 Drawing Sheets

U.S. PATENT DOCUMENTS

| | | | |
|---|---|---|---|
| 2004/0125815 A1* | 7/2004 | Shimazu et al. | 370/411 |
| 2005/0286524 A1* | 12/2005 | Bennett | 370/389 |
| 2006/0212617 A1* | 9/2006 | Horio et al. | 710/52 |
| 2006/0285558 A1* | 12/2006 | Dottling et al. | 370/506 |
| 2007/0253449 A1* | 11/2007 | Das et al. | 370/498 |
| 2007/0268887 A1* | 11/2007 | Schwartz | 370/352 |
| 2010/0265891 A1* | 10/2010 | Belcea | 370/328 |
| 2011/0164140 A1* | 7/2011 | Venna et al. | 348/180 |

FOREIGN PATENT DOCUMENTS

| | | |
|---|---|---|
| JP | 64029141 A | 1/1989 |
| JP | 02200036 A | 8/1990 |
| JP | 04100454 A | 4/1992 |
| JP | 2003087317 A | 3/2003 |
| JP | 2005027199 A | 1/2005 |
| JP | 2006101339 A | 4/2006 |
| JP | 2006101340 A | 4/2006 |

OTHER PUBLICATIONS

Chinese language office action dated Jul. 7, 2011 and its English language translation for corresponding Chinese application 200780036338.0.

* cited by examiner

FIG. 8

| COUNTER i | r[i] | NUMBER k |
|---|---|---|
| 0 | 0 | 1 |
| 1 | 1 | |
| 2 | 0 | 1 |
| 3 | 1 | |
| 4 | 0 | 1 |
| 5 | 1 | |
| 6 | 0 | 2 |
| 7 | 0 | |
| 8 | 1 | |
| 9 | 0 | 2 |
| 10 | 0 | |
| 11 | 1 | |
| 12 | 0 | 3 |
| 13 | 0 | |
| 14 | 0 | |
| 15 | 1 | |
| 16 | 0 | 4 |
| 17 | 0 | |
| 18 | 0 | |
| 19 | 0 | |
| 20 | 1 | |

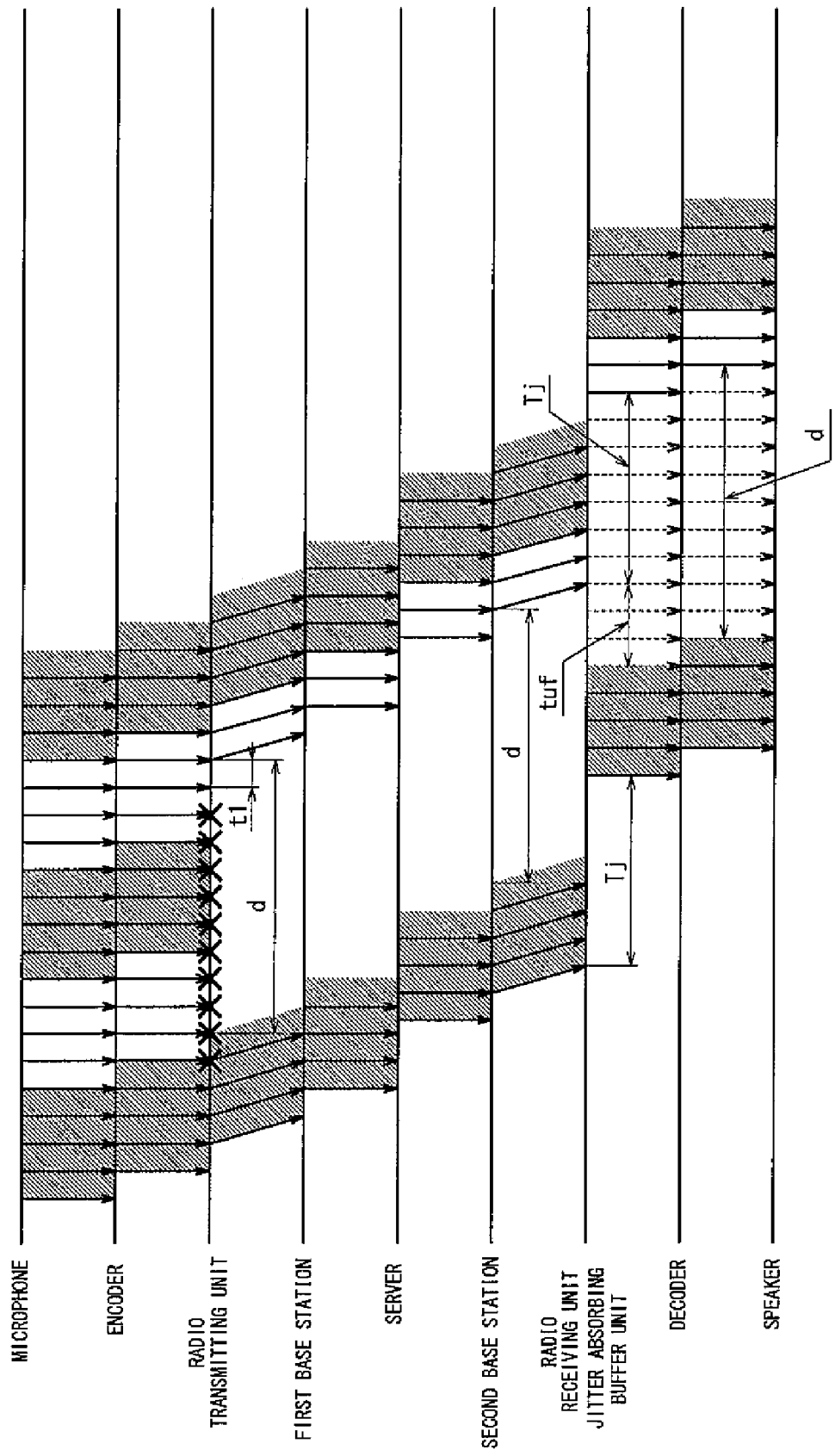

VOICE TRANSMISSION APPARATUS

TECHNICAL FIELD

The present invention relates to a voice transmission apparatus that encodes and communicates voice, and in particular, a voice transmission apparatus improved so as to reduce breakdown periods when communicating via a communication channel that may temporarily break down, such as a wireless LAN (Local Area Network) or a mobile phone network.

BACKGROUND ART

Conventionally, apparatuses and methods for transmitting encoded voice via a packet-switching network are known, including, for example, a "Packet-Switching Scheme" (refer to Patent Document 1) and a "Packet Communication Method" (refer to Patent Document 2).

Communication apparatuses to be used in a packet-switching network include those compliant with ATM (Asynchronous Transfer Mode) and IEEE802.3. The recent popularization of high-speed Internet access via cable television, ADSL (Asymmetric Digital Subscriber Line), optical fiber, and the like has led to the practical realization of VoIP (Voice over IP) apparatuses that transmit/receive voice data and therefore enable verbal communication over IP (Internet Protocol). Such apparatuses are also referred to as IP telephones.

The receiver of such a voice transmission apparatus is provided with a jitter absorbing buffer for absorbing transmission delay jitters that occur in the packet-switching network.

FIG. 13 is a block diagram illustrating a conventional packet-switching scheme. As shown in FIG. 13, in a conventional packet-switching scheme, a delay-difference absorbing buffer is provided at the receiver, the transmitter adds sequence numbers to packets belonging to the same call, and the receiver stores received packets in the delay-difference absorbing buffer while monitoring the sequence numbers of the received packets. In addition, reading of received packets from the delay-difference absorbing buffer starts at a constant rate upon the lapse of a predetermined period of time from the moment the first packet belonging to the relevant call is received.

When there is a loss in the sequence numbers of received packets, the receiver stores the same number of excess packets as the lost sequence numbers into the delay-difference absorbing buffer. In addition, when an underflow of the buffer occurs, the excess packets are inserted and replayed, and when packets having sequence numbers which should have been replayed are received during an underflow after insertion, such packets are discarded. Furthermore, when the delay-difference absorbing buffer overflows, the overflowed packets are discarded.

Accordingly, it is now possible to read and replay packets from the buffer at a certain timing without varying the playback timing. An excess packet is also called a dummy packet and is a packet that is either silent, contains background noise, or a repetition of a previously received packet. However, when the delay-difference absorbing buffer overflows due to a premature arrival of packets, the overflowed packets are discarded and the playback timing is altered. When a loss in sequence numbers occurs due to packet discarding and the like, excess packets are stored in the buffer.

In FIG. 13, when packets are received from a receiving line 1, a sequence number checking circuit 2 checks the sequence numbers of received packets. When there is a skip in the sequence numbers, the sequence number checking circuit 2 notifies a dummy packet generating circuit 3 by just that much, and in the case of voice, dummy packets such as silent packets, background noise packets and the like are to be written into a delay-difference absorbing buffer memory 4.

In addition, when the delay-difference absorbing buffer memory 4 is full and is unable to store received packets, the sequence number checking circuit 2 discards such packets. Furthermore, the sequence number checking circuit 2 detects a packet to arrive first after call setup is performed and notifies the same to a timer 5, and after a stochastically sufficiently long time D, starts consecutive playback of packets from the delay-difference absorbing buffer memory 4.

On the other hand, when the delay-difference absorbing buffer memory 4 becomes empty and an underflow occurs, dummy packets from the dummy packet generating circuit 3 are replayed and the occurrence of the underflow is notified to the sequence number checking circuit 2. When the relevant packets are subsequently received, the sequence number checking circuit 2 immediately discards such packets. The value of the time D, call setup information, and the like are to be notified to the respective circuits from a control circuit 6.

Currently, amidst the popularization of wireless LANs and mobile phone networks, demands are being made for realizing VoIP on such a wireless communication channel. With a wireless communication channel, communication quality may temporarily decline and, as a result, communication may be lost for a relatively long period of time. While the behavior at this time depends on the wireless communication protocol of the wireless communication channel, descriptions thereof are given in, for example, "Data Communication Apparatus" (refer to Japanese Patent Laid-Open No. 2006-101339) and "Data Communication Apparatus" (refer to Japanese Patent Laid-Open No. 2006-101340) by the present inventor.

That is, when a large number of packets awaiting transmission are transmitted after a relatively long communication breakdown, in some cases, the transmission causes downstream congestion or strains the processing capability of the receiver. This phenomenon is called a delay spike.

In addition, conventionally, in response to increasing demands for voice packet transmission, wireless communication apparatuses provided with QoS (Quality of Service) control in which control is executed in correspondence to service class have been emerging. With such apparatuses, since delay is reduced while errors and discarding are allowed in regards to voice packets, occurrences of delay spikes can be prevented.

Patent Document 1: Japanese Patent Laid-Open No. 01-029141
Patent Document 2: Japanese Patent Laid-Open No. 04-100454

SUMMARY OF INVENTION

Technical Problem

When voice packets are transmitted through a wireless communication channel in which such a delay spike occurs, a large number of packets arrive after a jitter absorbing buffer of a receiving terminal apparatus underflows. Among these packets, those having arrived after a playback time are discarded while those having arrived before the playback time are replayed.

FIG. 14 is an explanatory diagram showing the behavior of voice frames or packets transmitted through the respective parts or apparatuses in conventional art. In the drawing, the abscissa represents time and the arrows indicate the behavior of voice frames and packets storing voice frames transmitted from top to bottom. One arrow represents one voice frame or packet and, for the sake of clarity of the diagram, hatchings have been applied every four arrows. However, it should be noted that the hatchings are only for convenience and do not represent differences in data types or functions.

As shown in FIG. 14, parts and apparatuses related to transmission include a microphone, an encoder, a radio transmitting unit, a first base station, a server, a second base station, a radio receiving unit+a jitter absorbing buffer unit, a decoder, and a speaker. After receiving voice frames or packets, these parts and apparatuses output the voice frames or packets after the lapse of a given delay time. While the delay time is dependent on operations of the respective parts and apparatuses, a delay equivalent to one frame or packet is generated in the encoder, the radio transmitting unit, the first base station, the second base station, and the decoder. Furthermore, a delay equivalent to 2.5 packets is generated at the server. The jitter absorbing buffer unit accumulates J number of packets upon initialization, where J=7. Since one voice frame is stored in one packet, a predetermined accumulation time Tj is J times the voice frame period.

The operations shown in FIG. 14 start from a situation in which voice transmission is at a steady state. In a steady state, J number of packets corresponding to the predetermined accumulation time Tj is stored in the jitter absorbing buffer unit. The drawing shows a situation where four packets arrive at the jitter absorbing buffer unit after being subjected to a standard delay set in the steady state. Four voice frames are replayed after being subjected to a delay of Tj at the jitter absorbing buffer unit.

Subsequently, the wireless communication channel between the radio transmitting unit and the first base station degrades, whereby transmission breaks down over a time d, where d is 10 times the voice packet period. Voice packets are continuously generated even during this breakdown period and are retained anterior to the radio transmitting unit.

While the radio transmitting unit recommences packet transmission after the lapse of the time d and upon recovery of the wireless communication channel, the lapse of a delay time t1 (in this example, assumed to be one voice frame period) is required. As such, transmission is recommenced after the lapse of t1 or more.

Upon recommencement of transmission, a large number of retained packets are transmitted in a spike pattern. Since the packets impose a spike load on a downstream communication apparatus and server, it is likely that the packets will further generate a delay or cause congestion. Since the time d exceeds the predetermined accumulation time Tj of the jitter absorbing buffer unit by three frames, during the period of time denoted by time tuf or, in other words, during three frames, packets fail to arrive in time for the playback timing and an underflow occurs. During the occurrence of an underflow, packet interpolation is performed. For performing interpolation during an underflow, a method is used in which a previous frame is extrapolated and gain is gradually reduced. In addition, packets arriving after the playback timing are discarded. Since packets arriving after the time tuf are in time for the playback timing, playback commences thereon. Furthermore, due to the packets arriving in a large number, packets corresponding to the predetermined accumulation time Tj of a jitter absorbing buffer unit 21 are restored quickly in an ideal case where the band of the communication channel is sufficiently wide.

However, there are cases where the band of the communication channel is not wide enough to enable simultaneous transmission of a large number of packets. Therefore, packets are further delayed and the proportion of packets that fail to arrive before the playback time among those arriving at the receiving terminal apparatus increases. As a result, a problem arises in that packets transmitted at the expense of straining the band still fail to arrive before the playback time and end up being discarded.

In addition, there is a problem in that with respect to an intervening server existing along the communication channel and the fact that the number of housed lines as per specifications must be guaranteed, subjecting the server to a spike load presents a risk.

Next, a description will be given on a case of a wireless communication channel provided with QoS control and which promptly discards delayed voice packets.

FIG. 15 is an explanatory diagram similar to FIG. 14 showing the behavior of a conventional art wireless communication channel provided with QoS control and which promptly discards delayed voice packets. As shown in FIG. 15, in this case, the radio transmitting unit immediately discards untransmittable packets during the time d in which the wireless communication channel breaks down. With voice transmission whose objective is to establish a call, delays are known to cause a significant decline in the quality evaluation value. As such, discarding delayed packets is an important measure.

While the radio transmitting unit recommences transmission after the lapse of the time d and upon recovery of the wireless communication channel, the lapse of a delay time t1 (in this example, assumed to be one voice frame period) is required. As such, transmission is recommenced after the lapse of t1 or more.

When packets start to arrive, the jitter absorbing buffer generates an underflow and becomes empty. Since the jitter absorbing buffer unit manages the playback timing of arrived packets, playback is not performed immediately upon arrival. Instead, playback commences at a timing that takes a delay of the predetermined accumulation time Tj into consideration. While the accumulated amount at the jitter absorbing buffer is restored as a result, there is a problem in that the underflow extends the period of time in which packets that should be replayed fail to arrive. During this period, although interpolation is initially performed, the gain of the voice signal gradually drops and only comfortable noise is outputted.

An object of the present invention is to provide a voice transmission apparatus that eliminates wasteful discarding of transmitted packets, prevents a server from being subjected to spike loads, and prevents the period of time in which packets to be replayed fail to arrive from being extended.

Solution to Problem

In order to achieve the object described above, a voice transmission apparatus according to the present invention includes: a transmitting unit that transmits packets storing voice data to a packet-switching network; a receiving unit that receives the packets from the packet-switching network; a jitter absorbing buffer unit provided in the receiving unit and which absorbs a transmission delay in the packets; and a transmission wait control unit provided in the transmitting unit and which links packets to be transmitted when transmission temporarily breaks down to a queue, wherein the transmission wait control unit is provided with an accumulated time computing unit that computes an accumulated time of the voice data in the packets linked to the queue, the transmission wait control unit extracts an oldest linked packet from the queue and discards the same so that the accumulated time computed by the accumulated time computing unit becomes equal to or less than a threshold in order to continuously link new packets to the queue, thereby equalizing the threshold to an accumulation time of the jitter absorbing buffer unit.

In addition, a voice transmission apparatus according to an embodiment of the present invention is preferably arranged so that the receiving unit notifies the transmission wait control unit of the accumulation time of the jitter absorbing buffer unit, and the transmission wait control unit updates the threshold with the notified accumulation time.

Furthermore, a voice transmission apparatus according to another embodiment of the present invention is preferably arranged so that: the transmission wait control unit is provided with a discard judging unit that judges whether the packets linked to the queue are to be discarded or not and performs discarding according to a judgment by the discard judging unit; and the discard judging unit performs judgment so as to vary the number of packets k within a range of $1 \leq k \leq L$ if reference character L denotes the maximum length of the queue and that packets are assumed to be discarded at a rate of one packet per k number of packets transmitted, and the longer the accumulated time computed by the accumulated time computing unit, the smaller the number of packets k, while the shorter the accumulated time, the larger the number of packets k.

Advantageous Effects on Invention

According to the present invention, wasteful discarding of transmitted packets is eliminated, a server is no longer subjected to spike loads, and the period of time in which packets to be replayed fail to arrive due to underflow is prevented from being extended.

BRIEF DESCRIPTION OF DRAWINGS

FIG. 8 is an explanatory diagram showing, using a table, the relationship between a reference value r[i] of an array with respect to a counter i and the number of packets k;

FIG. 15 is an explanatory diagram similar to FIG. 14 showing the behavior of a conventional art wireless communication channel provided with QoS control and which promptly discards delayed voice packets.

Figure 1:
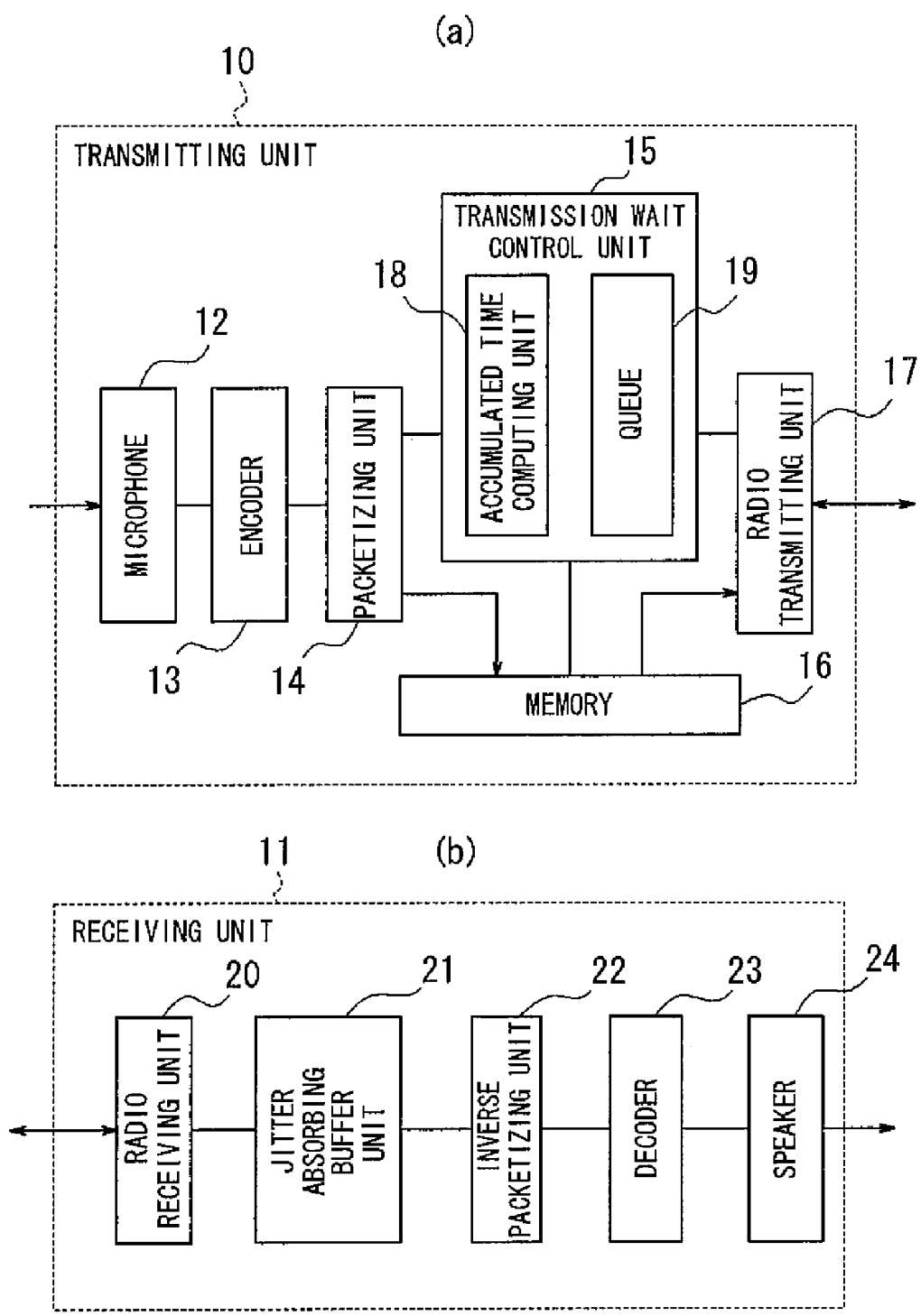
FIG. 1 shows a transmitting unit and a receiving unit of a voice transmission apparatus according to a first embodiment of the present invention, wherein (a) is a block diagram of the transmitting unit and (b) is a block diagram of the receiving unit.

REFERENCE SIGNS LIST 10, 35 Transmitting unit
11 Receiving unit
12 Microphone
13 Encoder
14 Packetizing unit
15, 36 Transmission wait control unit
16 Memory
17 Radio transmitting unit
18 Accumulated time computing unit
19 Queue
20 Radio receiving unit
21 Jitter absorbing buffer unit
22 Inverse packetizing unit
23 Decoder
24 Speaker
25 First terminal apparatus
26 Second terminal apparatus
27 First base station
28 Second base station
29 IP network
30 Server
37 Discard judging unit
38 Counter
39 Array

DESCRIPTION OF EMBODIMENTS

A best mode for carrying out the present invention will now be described with reference to the drawings.

First Embodiment

FIG. 1 shows a transmitting unit and a receiving unit of a voice transmission apparatus according to a first embodiment of the present invention, wherein (a) is a block diagram of the transmitting unit and (b) is a block diagram of the receiving unit. As shown in FIG. 1, a transmitting unit 10 and a receiving unit 11 constitute a voice transmission apparatus incorporated into an integrated terminal apparatus and which communicates with a base station realizing wireless data communication. The transmitting unit 10 includes: a microphone 12; an encoder 13; a packetizing unit 14; a transmission wait control unit 15; a memory 16; and a radio transmitting unit 17. The transmission wait control unit 15 has an accumulated time computing unit 18 and a queue 19. The receiving unit 11 includes: a radio receiving unit 20; a jitter absorbing buffer unit 21; an inverse packetizing unit 22; a decoder 23; and a speaker 24.

Figure 2:
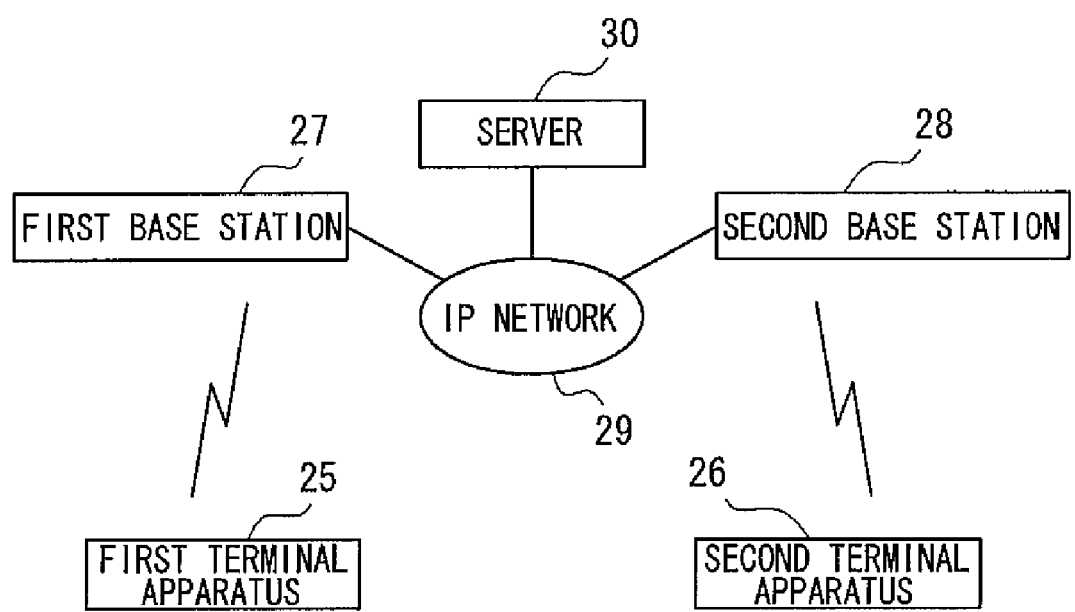
FIG. 2 is a block diagram illustrating a communication system based on a packet-switching network using the voice transmission apparatus shown in FIG. 1.

FIG. 2 is a block diagram illustrating a communication system based on a packet-switching network using the voice transmission apparatus shown in FIG. 1. In FIG. 2, the voice transmission apparatus constituted by the transmitting unit 10 and the receiving unit 11 shown in FIG. 1 is depicted as a first terminal apparatus 25 and a second terminal apparatus 26. The first terminal apparatus 25 performs wireless communication with a first base station 27 while the second terminal apparatus 26 performs wireless communication with a second base station 28. The first base station 27 and the second base station 28 connect via a wired communication channel to a dedicated IP network 29 of a service provider.

Communication is realized between the first terminal apparatus 25 and the first base station 27 by executing a radio layer protocol. After establishing a wireless communication channel between the first base station 27, the first terminal apparatus 25 performs packet communication via the IP network 29. The same thing applies to between the second terminal apparatus 26 and the second base station 28.

A server 30 is further connected to the IP network 29, whereby IP packets to be communicated are first collected at the server 30, and after processing and services unique to the provider are performed, sent to the opposing terminal apparatus.

The transmitting unit 10 and the receiving unit 11 shown in FIG. 1 and which constitute the voice transmission apparatus will now be described. It is hereby assumed that wireless communication channels have already been established between the first terminal apparatus 25 and the first base station 27 and between the second terminal apparatus 26 and the second base station 28. It is further assumed that the transmitting unit 10 is placed inside the first terminal apparatus 25, the receiving unit 11 is placed inside the second terminal apparatus 26, and the transmitting unit 10 and the receiving unit 11 transmit voice.

First, in an initialization stage for commencing voice transmission, an accumulated time Tt stored in the accumulated time computing unit 18 is initialized to 0, the queue 19 is emptied, and a predetermined threshold Tw of the transmission wait control unit 15 and a predetermined accumulation time Tj of the jitter absorbing buffer unit 21 are both initialized to a predetermined initial value. In the present embodiment, the initial value is set to 140 ms corresponding to seven voice frames, where a single voice frame is 20 ms.

At the transmitting unit 10, voice is converted into an electric signal by the microphone 12 and inputted to the encoder 13. The encoder 13 performs A/D conversion on the electric signal, and encodes the voice using GSM (Global System for Mobile communication)-AMR (Adaptive Multi-Rate), a known encoding scheme. In this case, voice is sampled at 8 kHz and encoded per 20 ms-frames. The encoding rate is 12.2 kbps.

The packetizing unit 14 stores one or several voice frames corresponding to 20 ms in a packet addressed to the second terminal apparatus 26. Protocols to be used during packetization are RTP (Real-time Transport Protocol)/UDP (User Datagram Protocol)/IP. The smaller the number of voice frames to be stored in a single packet, the shorter the delay, resulting in preferable quality estimation. However, there is a disadvantage in that an increase in the proportion of headers to be used by the protocols among total data necessitates high throughput. In the present embodiment, since the network band is sufficiently wide, one voice frame is stored in one packet.

The packetizing unit 14 stores a created packet into the memory 16, and further notifies an address on the memory 16 to the transmission wait control unit 15. The transmission wait control unit 15 judges whether the queue 19 is empty or not, and if empty, judges whether the radio transmitting unit 17 is in a transmittable state or not.

The radio transmitting unit 17, having already commenced wireless data communication with the first base station 27, is normally in a transmittable state. However, an untransmittable state may occasionally exist due to a temporary decline in the quality of the wireless communication channel. The radio transmitting unit 17 has a register indicating this state, and the transmission wait control unit 15 reads the register to judge whether the radio transmitting unit 17 is in a transmittable state or not. If in a transmittable state, the transmission wait control unit 15 notifies the notified address to the radio transmitting unit 17. The radio transmitting unit 17 transmits a packet in the memory 16 identifiable by the notified address to the first base station 27 via the wireless communication channel. Once transmission is complete, the radio transmitting unit 17 releases the packet on the memory 16.

In other cases, namely, when the queue 19 is not empty or when the radio transmitting unit 17 is not in a transmittable state, the transmission wait control unit 15 notifies the notified address to the accumulated time computing unit 18. The accumulated time computing unit 18 computes a playback time Tp of voice data contained in the packet identifiable by the notified address. When one voice frame is to be always stored in one packet, the playback time Tp is 20 ms. However, a configuration is also possible in which the number of voice frames to be stored in one packet varies. In such a case, the accumulated time computing unit 18 computes the playback time Tp by studying the packet identifiable by the notified address.

If Tt denotes a stored current accumulated time and Tp denotes a playback time of the notified packet, the accumulated time computing unit 18 judges whether the sum of both values is equal to or less than a threshold Tw.

$$Tt+Tp \leq Tw \quad (1)$$

When the sum of both values is equal to or less than the threshold Tw, the accumulated time computing unit 18 updates the value of Tt with the sum (Tt+Tp), and notifies the transmission wait control unit 15 that the inequality expressed by Formula (1) is satisfied. Upon this notification, the transmission wait control unit 15 links the notified address to the queue 19.

When the sum of both values exceeds the threshold Tw, the accumulated time computing unit 18 notifies the transmission wait control unit 15 that the inequality expressed by Formula (1) is not satisfied. Upon this notification, the transmission wait control unit 15 extracts the address of a packet whose order is the oldest among the queue 19, and notifies the accumulated time computing unit 18 that the packet is to be deleted from the queue 19.

The accumulated time computing unit 18 computes a playback time Tp of voice data contained in the packet identifiable by the notified address, and subtracts the same from the current accumulated time Tt. That is, the accumulated time computing unit 18 computes (Tt−Tp), and stores the same as the new value of Tt. Next, the transmission wait control unit 15 removes the address of a relevant packet from the queue 19, and further releases corresponding packet data in the memory 16. Subsequently, the transmission wait control unit 15 returns to processing for notifying the accumulated time computing unit 18 of the notified address for storing the new packet.

Due to this operation, the total playback time of voice included in queued packets stored in the queue 19 becomes equal to or less than the threshold Tw and the newest packet is now linked to the queue 19. It is a feature of the present invention that the predetermined threshold Tw is equalized to the predetermined accumulation time of the jitter absorbing buffer unit 21.

When the radio transmitting unit 17 changes from an untransmittable state to a transmittable state, the transmission wait control unit 15 judges whether or not linked packets are present in the queue 19. When packets are present, the transmission wait control unit 15 selects a packet whose order is the oldest among the packets, and notifies the accumulated time computing unit 18 that the packet is to be deleted from the queue 19.

The accumulated time computing unit 18 computes the playback time Tp of the notified packet and subtracts the same from the accumulated time Tt. Subsequently, the transmission wait control unit 15 deletes the address of a relevant packet from the queue 19 and notifies the address to the radio transmitting unit 17. The radio transmitting unit 17 transmits a packet in the memory 16 identifiable by the notified address to the first base station 27 via the wireless communication channel. Once transmission is complete, the radio transmitting unit 17 releases a relevant packet on the memory 16.

Even when this operation is in progress, a new voice packet can be generated and inputted to the transmission wait control unit 15. This packet is to be linked to the queue 19 in accordance with the operation described above. Since the speed at which an old packet is extracted is greater than the speed at which a new packet is linked to the queue 19, the queue 19 is swiftly reduced and eventually becomes empty.

In FIG. 2, the first base station 27 extracts packet data of the IP layer or above from the packet received from the transmitting unit 10, and transmits the same to the IP network 29. While the IP packets are addressed to the second terminal apparatus 26, due to service and management requirements, the IP packets must travel through the server 30. Therefore, the IP packets are to be encapsulated inside a packet addressed from the first base station 27 to the server 30. The server 30 delivers the received packet to the second terminal apparatus 26 via the second base station.

Next, the receiving unit 11 will be described. The receiving unit 11 is provided at the second terminal apparatus 26. The radio receiving unit 20 receives packets from the second base station 28. The packets are discarded when there is an error in the received packet data, and handed over to the jitter absorbing buffer unit 21 when the received packet data is good.

The jitter absorbing buffer unit 21 accumulates voice frames corresponding to a predetermined accumulation time Tj upon commencing communication. The predetermined accumulation time Tj is to be determined by taking into consideration how much delay jitter of the communication channel is to be absorbed and how much delay is to be permitted with respect to voice quality evaluation. If the number of packets corresponding to the predetermined accumulation time Tj is to be denoted by a variable J, in the present embodiment, it is assumed that J=7 packets or, in other words, Tj=140 ms. When new packets fail to arrive during the playback of voice frames corresponding to the predetermined accumulation time Tj, an underflow occurs.

The jitter absorbing buffer unit 21 secures a buffer of around twice of Tj and discards packets arriving past the buffer since overflows are occurring at such packets. Alternatively, the jitter absorbing buffer unit 21 may be configured so as to discard a packet with the oldest order in the buffer and store an arrived packet into the buffer.

Since an RTP header is capable of storing sequence numbers and time stamps, packet loss due to discarding and errors can be detected. In this case, a packet indicating a packet loss is to be generated and stored in the jitter absorbing buffer unit 21, whereby upon playback, PLC (Packet Loss Concealment) provided at the decoder 23 is to be executed.

Methods of PCL include repeating a previous frame, extrapolation, and replaying a comfort noise. In addition, error concealment of lost frames in GSM-AMR is described in, for example, "AMR Speech Codec; Error Concealment of Lost Frames (Release 6), 3GPP TS 26.091 V6.0.0 (2004-12)".

When an underflow occurs in the present embodiment, as packets subsequently start to arrive, the jitter absorbing buffer unit 21 accumulates and delays voice frames corresponding to the predetermined accumulation time Tj in the same manner as upon communication commencement. After the accumulated amount reaches the predetermined accumulation time Tj, packets are read in sequence starting from the oldest in accordance with the playback timing and handed over to the inverse packetizing unit 22 to be replayed.

Alternatively, as is the case with conventional art, when an underflow occurs, the jitter absorbing buffer unit 21 can also continue counting the playback timing based on a sequence number or a time stamp in the RTP header in the same manner as packet loss, discard packets that are not in time for the playback timing, and upon recovery of the delay jitter, await the arrival of packets in time for the playback timing.

After accumulating voice frames corresponding to the predetermined accumulation time Tj upon communication commencement, the jitter absorbing buffer unit 21 sequentially reads packets starting from the oldest in accordance with the playback timing and hands over the same to the inverse packetizing unit 22.

The inverse packetizing unit 22 extracts the voice frame in the handed packet, and hands over the same to the decoder 23. The decoder 23 performs decoding on the code to create a voice frame and outputs an analog signal. The analog signal is converted by the speaker 24 into sound waves to be perceived by human hearing.

In the present embodiment, in the initialization stage for commencing voice transmission, the predetermined threshold Tw of the transmission wait control unit 15 and the predetermined accumulation time Tj of the jitter absorbing buffer unit 21 are both initialized to a predetermined initial value. However, depending on the state of delay jitter of the communication channel, the predetermined accumulation time Tj of the jitter absorbing buffer unit 21 can be dynamically varied.

In this case, the receiving unit 11 of the second terminal apparatus 26 notifies a new predetermined accumulation time Tj to the transmission wait control unit 15 of the transmitting unit 10 of the first terminal apparatus 25. The second terminal apparatus 26 is also provided with a transmitting unit 10 and a radio transmitting unit 17 while the first terminal apparatus 25 is also provided with a receiving unit 11 and a radio receiving unit 20 so as to form communication channels in the opposite direction. Notification is performed through these communication channels. Upon receiving notification of the new predetermined accumulation time Tj, the transmission wait control unit 15 updates the predetermined threshold Tw.

Figure 3:
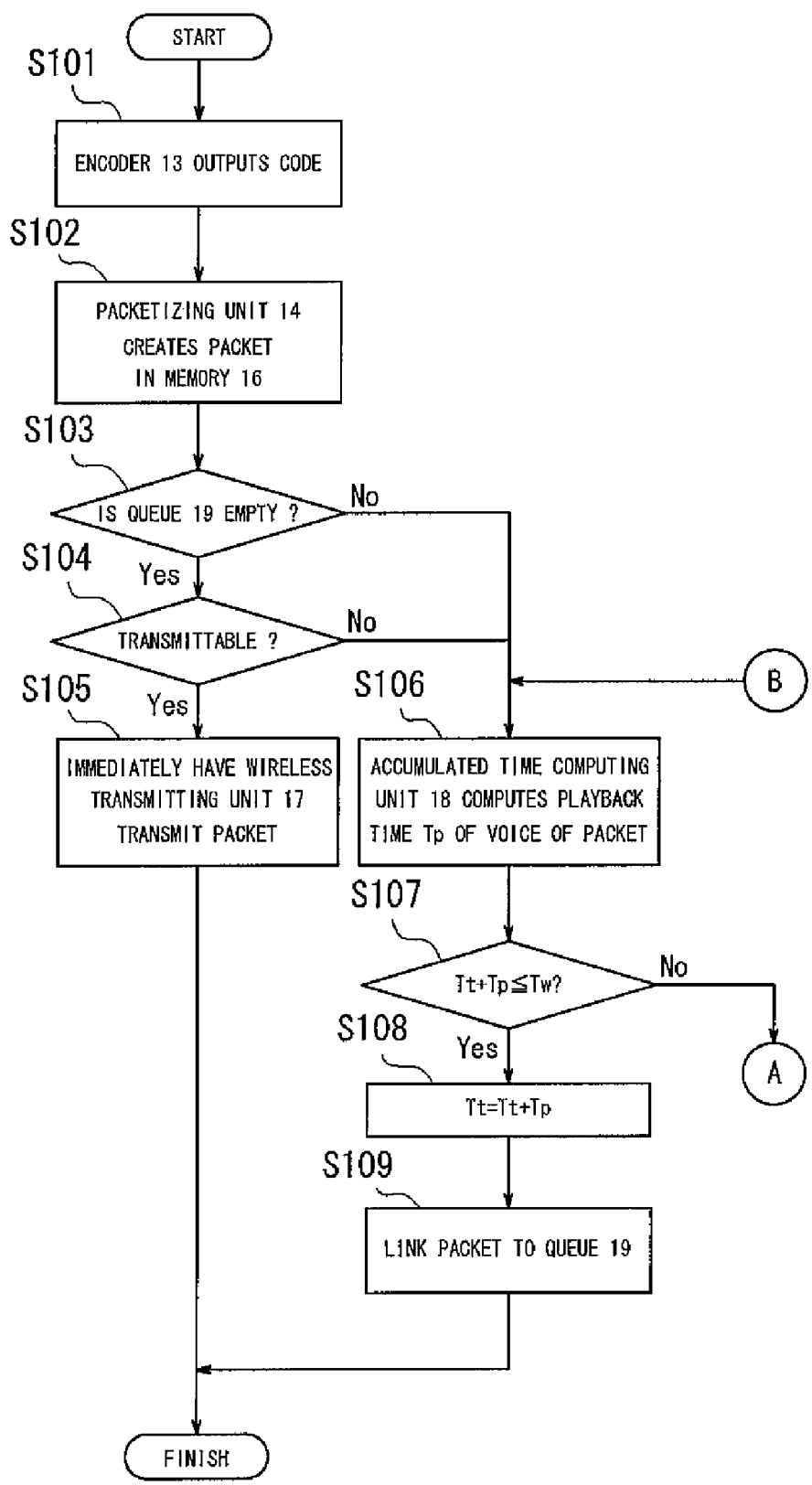
FIG. 3 is a flowchart (part 1) showing a processing procedure of the transmitting unit.
Figure 4:
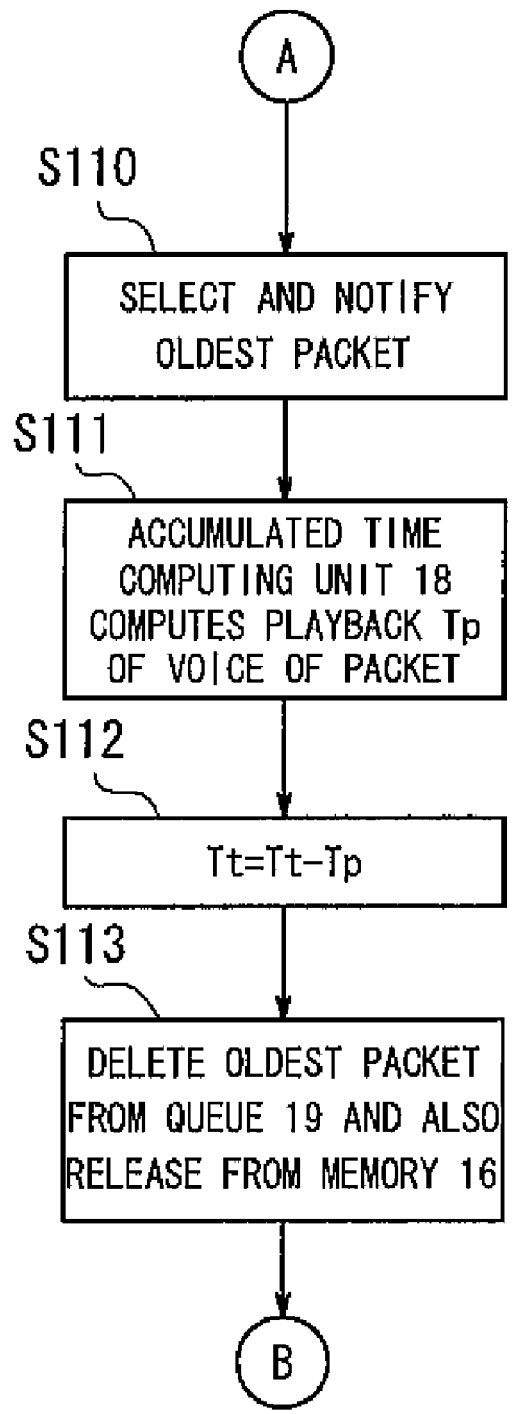
FIG. 4 is a flowchart (part 2) showing a processing procedure of the transmitting unit.

FIG. 3 is a flowchart (part 1) showing a processing procedure of the transmitting unit and FIG. 4 is a flowchart (part 2) showing a processing procedure of the transmitting unit.

However, it is assumed that before the processing shown in FIG. 3, in the initialization stage for commencing voice transmission, the accumulated time Tt stored in the accumulated time computing unit 18 is initialized to 0 and the queue 19 is initialized to empty. In addition, the processing of the transmitting unit 10 shown in FIG. 3 is to be repetitively executed every 20 ms, which is the voice frame period, in order to encode and transmit consecutive voice signals.

As shown in FIGS. 3 and 4, upon commencement of processing by the transmitting unit 10, firstly, the encoder 13 outputs a code (step S101). An electric signal of voice outputted by the microphone 12 is subjected to A/D conversion by the encoder 13, whereby the voice is encoded by GSM-AMR, a known encoding scheme. In this case, the voice is sampled at 8 kHz and encoded per 20 ms-frames. The encoding rate is 12.2 kbps.

Next, the packetizing unit 14 creates a packet in the memory 16 (step S102). In other words, the packetizing unit 14 stores one 20 ms-voice frame in a packet addressed to the second terminal apparatus 26. The protocols to be used during packetization are RTP/UDP/IP. The packetizing unit 14 stores the created packet into the memory 16, and further notifies an address on the memory 16 to the transmission wait control unit 15.

Next, a judgment is made on whether the queue 19 is empty or not (step S103). When the judgment on whether the queue 19 is empty or not reveals that the queue 19 is empty (a "yes" result), the transmission wait control unit 15 judges whether it is transmittable or not (step S104). In other words, the transmission wait control unit 15 judges whether the radio transmitting unit 17 is in a transmittable state or not. Although the radio transmitting unit 17, having already commenced wireless data communication with the first base station 27, is normally in a transmittable state, an untransmittable state may occasionally exist due to a temporary decline in the quality of the wireless communication channel. The radio transmitting unit 17 has a register indicating this state, whereby the transmission wait control unit 15 reads the register to judge whether the radio transmitting unit 17 is in a transmittable state or not.

When the judgment on whether it is transmittable or not reveals a transmittable state (a "yes" result), the transmission wait control unit 15 causes the radio transmitting unit 17 to immediately transmit a packet (step S105). The transmission wait control unit 15 notifies the notified address to the radio transmitting unit 17, and the radio transmitting unit 17 transmits a packet in the memory 16 identifiable by the notified address to the first base station 27 via the wireless communication channel. Once transmission is complete, the radio transmitting unit 17 releases the packet on the memory 16. Subsequently, processing is terminated.

On the other hand, when the judgment on whether the queue 19 is empty or not (step S103) reveals that the queue 19 is not empty (a "no" result) or when the judgment on whether it is transmittable or not (step S104) reveals an untransmittable state (a "no" result), the accumulated time computing unit 18 computes the playback time Tp of the voice of the packet (step S106). In other words, the accumulated time computing unit 18 computes a playback time Tp of voice data contained in the packet identifiable by the address notified by the transmission wait control unit 15. When one voice frame is to be always stored in one packet, the playback time Tp is 20 ms. However, a configuration is also possible in which the number of voice frames to be stored in one packet varies. In such a case, the accumulated time computing unit 18 computes the playback time Tp by studying the packet identifiable by the notified address.

Next, a judgment is made on whether the sum of the accumulated time Tt and the playback time Tp is equal to or less than the threshold Tw or not (step S107). In other words, if Tt denotes the stored current accumulated time and Tp denotes the playback time of the notified packet, the accumulated time computing unit 18 judges whether the sum of both values is equal to or less than the threshold Tw (refer to Formula (1)). When the judgment reveals that the sum of both values (Tt+Tp) is equal to or less than the threshold Tw (a "yes" result), the accumulated time computing unit 18 updates the value of Tt with the sum (Tt=Tt+Tp) (step S108). After the update, the transmission wait control unit 15 links the notified address to the queue 19 (step S109) and subsequently terminates processing.

On the other hand, when the judgment of whether the sum of both values is equal to or less than the threshold Tw (step S107) reveals that the sum is not equal to or less than the threshold Tw (a "no" result), the oldest packet is selected and notified (step S110). In other words, the transmission wait control unit 15 extracts the address of a packet whose order is the oldest in the queue 19.

Next, the accumulated time computing unit 18 computes the playback time Tp of the voice of the packet (step S111). In other words, the transmission wait control unit 15 notifies the address of the extracted oldest packet to the accumulated time computing unit 18 and, at the same time, notifies that the packet is to be deleted from the queue 19. Meanwhile, the accumulated time computing unit 18 computes the playback time Tp of the voice data contained in the packet identifiable by the notified address.

Subsequently, the accumulated time computing unit 18 subtracts the playback time Tp from the current accumulated time Tt (Tt−Tp), and stores the obtained result as the new Tt value (Tt=Tt−Tp) (step S112).

Next, the oldest packet is deleted from the queue 19 and also released from the memory 16 (step S113). In other words, the transmission wait control unit 15 removes the address of a relevant packet from the queue 19, and further releases corresponding packet data in the memory 16.

Subsequently, the procedure returns to step S106.

As shown, by undergoing the processing described above, the total playback time of voice included in queued packets stored in the queue 19 become equal to or less than the threshold Tw, and the newest packet is now linked to the queue 19. It is a feature of the present invention that the predetermined threshold Tw is equalized to the predetermined accumulation time Tj of the jitter absorbing buffer unit 21.

Figure 5:
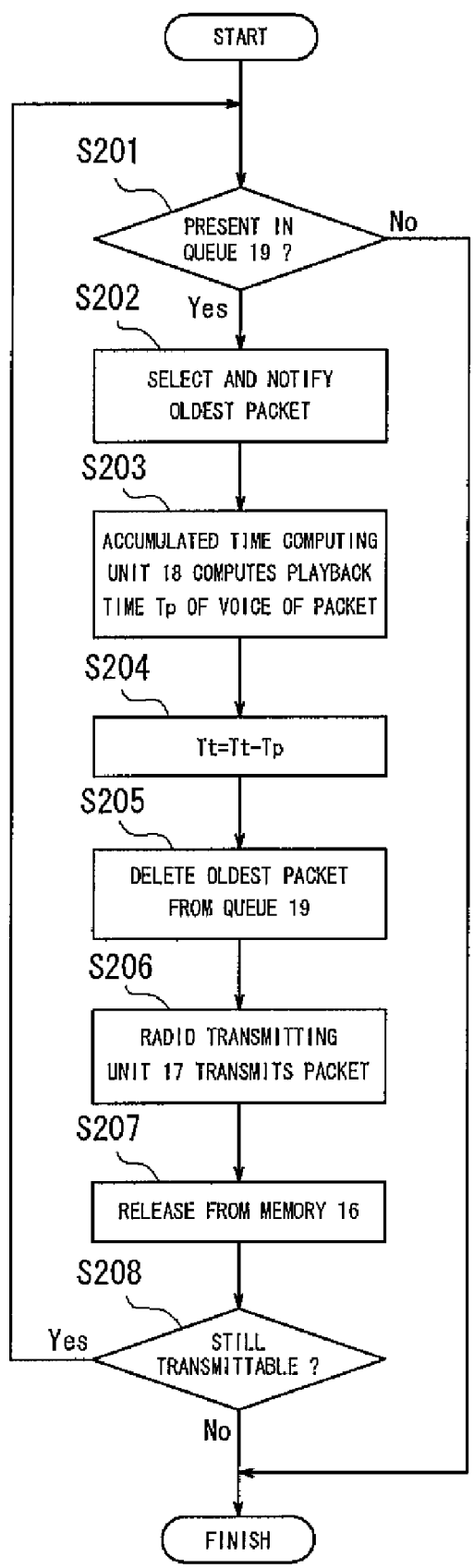
FIG. 5 is a flowchart showing a processing procedure executed when a radio transmitting unit changes from an untransmittable state to a transmittable state.

FIG. 5 is a flowchart showing a processing procedure executed when the radio transmitting unit changes from an untransmittable state to a transmittable state. As shown in FIG. 5, in the present embodiment, when the radio transmitting unit 17 changes from an untransmittable state to a transmittable state, first, the transmission wait control unit 15 judges whether or not linked packets are present in the queue 19 (step S201).

When the judgment reveals that there are linked packets (a "yes" result), the oldest packet is selected and notified (step S202). In other words, the transmission wait control unit 15 selects a packet whose order is the oldest among the queue 19, and notifies the accumulated time computing unit 18 that the packet is to be deleted from the queue 19. Meanwhile, when the judgment reveals that there are no linked packets (a "no" result), the processing is terminated.

Next, the accumulated time computing unit 18 computes the playback time Tp of the voice of the notified packet (step S203). Subsequently, the accumulated time computing unit 18 subtracts the playback time Tp from the accumulated time Tt (Tt−Tp) (step S204).

Next, the transmission wait control unit 15 deletes the address of the oldest packet from the queue 19 (step S205). Subsequently, the transmission wait control unit 15 notifies the address to the radio transmitting unit 17, and the radio transmitting unit 17 transmits a packet in the memory 16 identifiable by the notified address to the first base station 27 via the wireless communication channel (step S206). Once transmission is complete, the radio transmitting unit 17 releases a relevant packet on the memory 16 (step S207).

Subsequently, the transmission wait control unit 15 judges whether the radio transmitting unit 17 is still in a transmittable state or not (step S208). When the judgment reveals a transmittable state (a "yes" result), the procedure returns to step S201, and when the judgment reveals an untransmittable state (a "no" result), the processing is terminated.

A description will now be given on operations of the present embodiment arising from the feature that the threshold Tw is equal to the predetermined accumulation time Tj of the jitter absorbing buffer unit 21.

Figure 6:
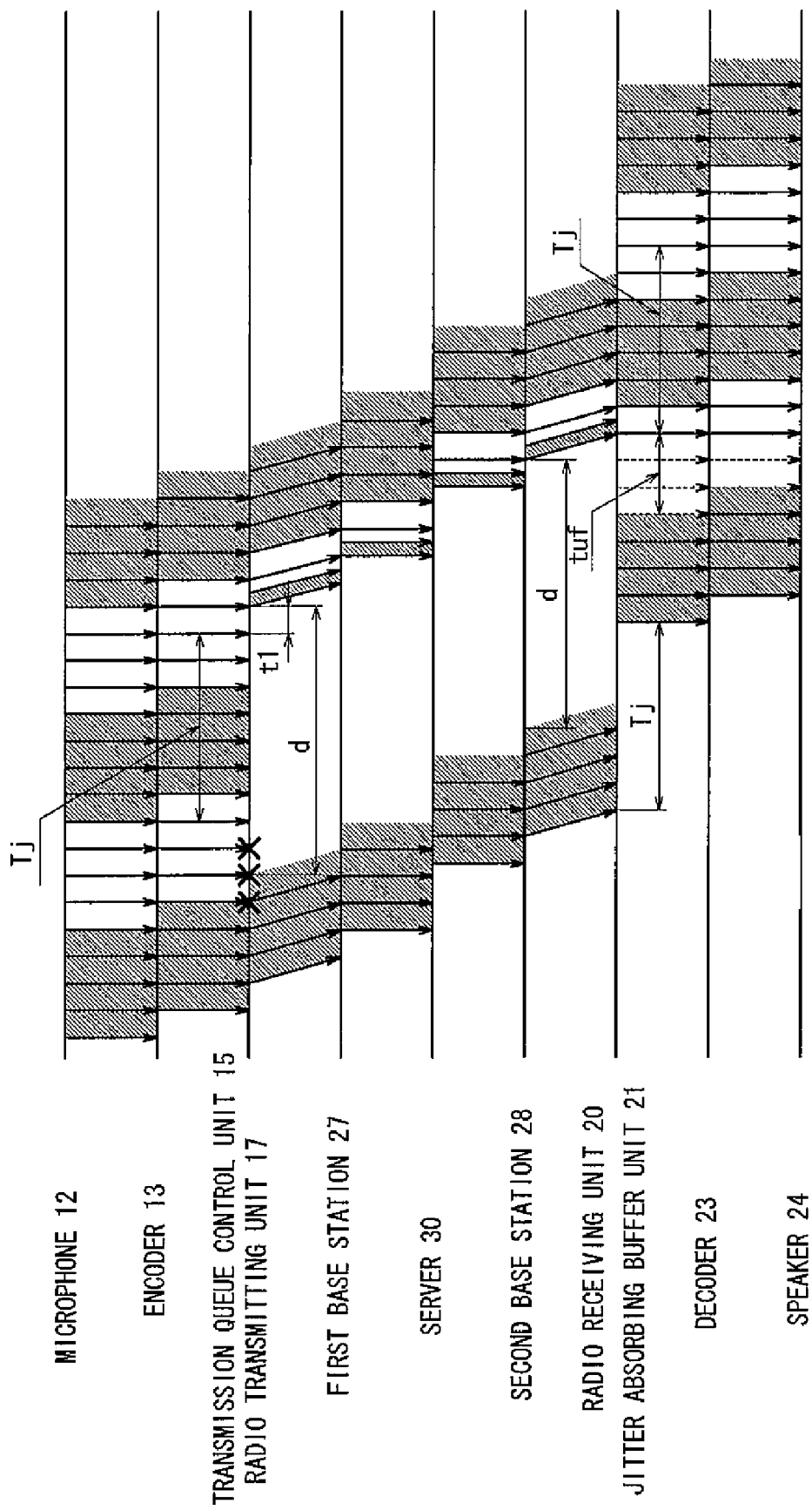
FIG. 6 is an explanatory diagram showing the behavior of voice frames or packets transmitted through respective parts or apparatuses according to the present embodiment.

FIG. 6 is an explanatory diagram showing the behavior of voice frames or packets transmitted through the respective parts or apparatuses according to the present embodiment. In the drawing, the abscissa represents time and the arrows represent the behavior of voice frames and packets storing voice frames transmitted from top to bottom. One arrow represents one voice frame or one packet and, for the sake of clarity of the diagram, hatchings have been applied every four arrows. However, it should be noted that the hatchings are only for convenience and do not represent differences in data types or functions.

As shown in FIG. 6, parts and apparatuses related to transmission include the microphone 12, the encoder 13, the transmission wait control unit 15+the radio transmitting unit 17, the first base station 27, the server 30, the second base station 28, the radio receiving unit 20+the jitter absorbing buffer unit 21, the decoder 23, and the speaker 24. After receiving voice frames or packets, these parts and apparatuses output the voice frames or packets after the lapse of a given delay time. While the delay time is dependent on operations of the respective parts and apparatuses, a delay equivalent to one frame or packet is generated in the encoder 13, the radio transmitting unit 17, the first base station 27, the second base station 28, and the decoder 23. Furthermore, a delay equivalent to 2.5 packets is generated at the server 30. The jitter absorbing buffer unit 21 accumulates J number of packets upon initialization, where J=7. Since one voice frame is stored in one packet, the predetermined accumulation time Tj is J times the period of the voice frame.

In FIG. 6, while a load is generated when passing packets corresponding to the jitter absorbing buffer, the risk of such a load or congestion does not increase unlimitedly. In this case, the operations shown in FIG. 6 start from a situation in which voice transmission is at a steady state. In a steady state, packets corresponding to the predetermined accumulation time Tj or, in other words, J number of packets are stored in the jitter absorbing buffer unit 21. The drawing shows a situation where four packets arrive at the jitter absorbing buffer unit 21 after being subjected to a standard delay set in the steady state. Four voice frames are replayed after being subjected to a delay of Tj at the jitter absorbing buffer unit 21.

Subsequently, the wireless communication channel between the radio transmitting unit 17 and the first base station 27 degrades, whereby transmission breaks down over a time d, where d is 10 times the voice packet period. When the radio transmitting unit 17 enters an untransmittable state, the transmission wait control unit 15 commences accumulation. While voice packets are being continuously generated even during the breakdown period d, only packets corresponding to the predetermined accumulation time Tj or, in other words, J=7 packets, are stored in the queue 19 of the transmission wait control unit 15.

Although the radio transmitting unit 17 recommences transmission after the lapse of the time d and upon recovery of the wireless communication channel, the lapse of a delay time t1 (in this case, assumed to be one voice frame period) is required. As such, transmission is recommenced after the lapse of t1 or more.

Upon recommencement of transmission, the packets linked to the queue 19 of the transmission wait control unit 15 are transmitted in a spike pattern. In this case, the number of packets is J=7. While the predetermined accumulation time Tj of the jitter absorbing buffer unit 21 cannot be significantly increased in regards to voice quality evaluation, the breakdown period of a wireless communication channel can sometimes become significantly long.

In the present embodiment, since only a certain number (I-number) of packets are accumulated regardless of how long the breakdown period is, the risk of congestion or increasing the load on the server 30 can be mitigated. In addition, compared to conventional examples provided with QoS, since a recovery of the jitter absorbing buffer unit 21 can be made even when playback is commenced at an earlier point in time, the breakdown period can be reduced.

The time d during which a communication breakdown occurs exceeds the predetermined accumulation time Tj of the jitter absorbing buffer unit 21 by three frames. Therefore, in FIG. 6, during the period of time denoted by time tuf or, in other words, during three frames, packets fail to arrive in time for the playback timing and an underflow occurs. During the occurrence of an underflow, packet interpolation is performed. As for a method of performing interpolation during an underflow, a previous frame is extrapolated while gain is gradually reduced. In FIG. 6, this interpolation is represented by the dotted-line arrows.

In addition, packets arriving after the playback timing are discarded. Since packets arriving after the time tuf are in time for the playback timing, playback commences on the packets. Furthermore, packets corresponding to the predetermined accumulation time Tj arrive promptly. The time Tj is required to replay the packets. When playback is concluded, the accumulated amount of the jitter absorbing buffer unit 21 reaches an amount corresponding to the predetermined accumulation time Tj and returns to a steady state.

Second Embodiment

Figure 7:
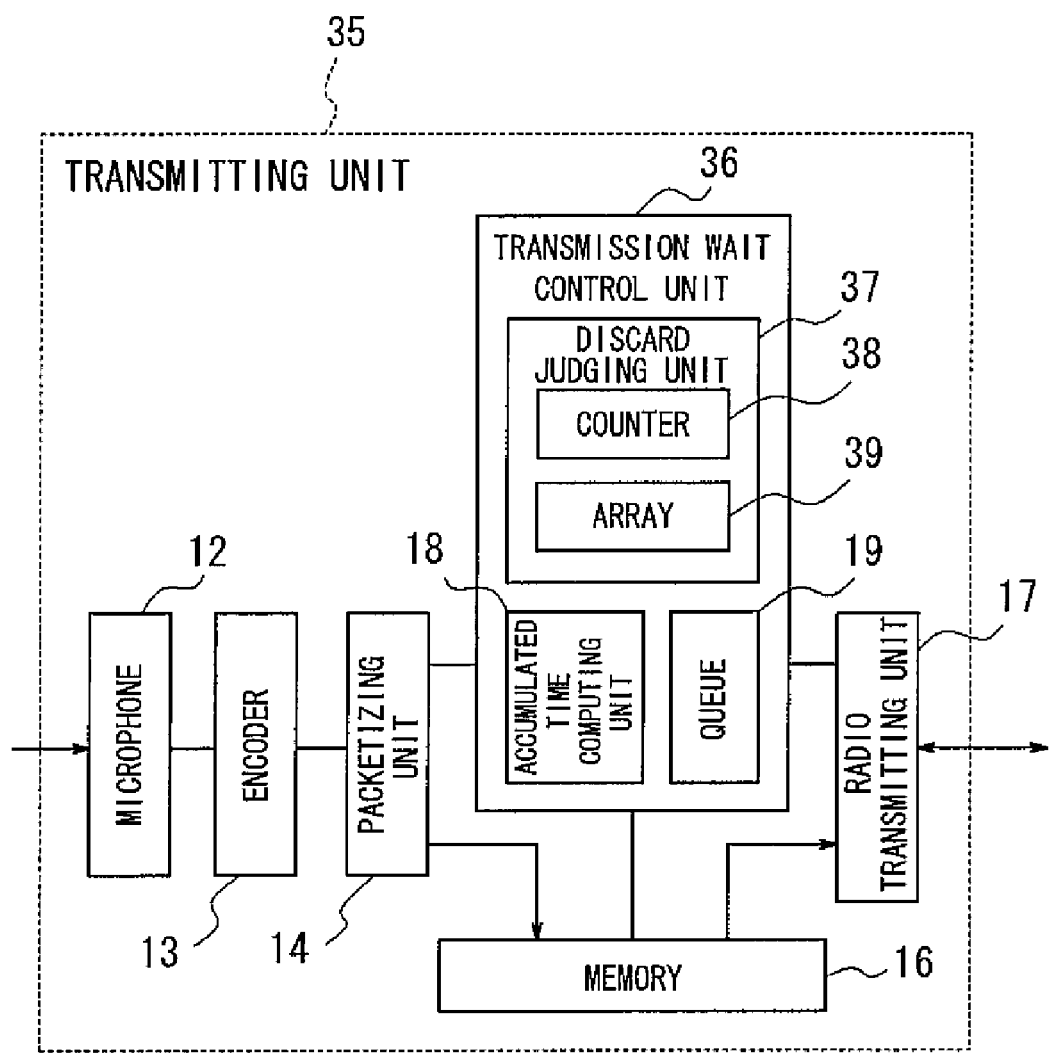
FIG. 7 is a block diagram showing a transmitting unit of a voice transmission apparatus according to a second embodiment of the present invention.

FIG. 7 is a block diagram showing a transmitting unit of a voice transmission apparatus according to a second embodiment of the present invention. As shown in FIG. 7, in place of the transmission wait control unit 15, a transmitting unit 35 includes a transmission wait control unit 36 provided with a function for judging packet discarding. In addition to the accumulated time computing unit 18 and the queue 19, the transmission wait control unit 36 includes a discard judging unit 37. The discard judging unit 37 is provided with a counter 38 and an array 39. Other configurations and effects are similar to those of the transmitting unit 10 (refer to FIG. 1).

One feature of a voice code is that even if voice frames are randomly lost, by extrapolating from a previous or subsequent frame, the subjective assessment value thereof does not decline significantly. The present embodiment utilizes this feature to discard voice frames with the transmission wait control unit 36 and causes the receiving unit 11 to extrapolate discarded packets. Consequently, albeit accompanied by minor declines in the subjective assessment value, transmission efficiency is enhanced and the spike load acting on the server 30 or a network apparatus is relieved.

When the radio transmitting unit 17 changes from an untransmittable state to a transmittable state, the discard judging unit 37 initializes the counter 38 retained therein to 0. Upon receiving a timing of a voice frame period of the encoder 13, the transmission wait control unit 36 repetitively performs operations. The transmission wait control unit 36 judges whether or not linked packets are present in the queue 19. When packets are present, the transmission wait control unit 36 selects a packet whose order is the oldest among the packets, and notifies the accumulated time computing unit 18 that the packet is to be deleted from the queue 19. The accumulated time computing unit 18 computes the playback time Tp of the notified packet and subtracts the same from the accumulated time Tt.

The transmission wait control unit 36 deletes the address of a relevant packet from the queue 19, notifies the address to the discard judging unit 37, and causes the same to perform judgment. If a variable i denotes the value of the counter 38 and reference character r denotes the array 23, the discard judging unit 37 references an array value r[i] whose index is i. The array 23 stores a value of 1 or 0, that is, 0 for a count to be transmitted or 1 for a count to be discarded. Therefore, the discard judging unit 37 notifies the transmission wait control unit 36 the reference value r[i] of the array 23 as the judgment result, and further increments the counter 38 by one.

Depending on the judgment result by the discard judging unit 37, the transmission wait control unit 36 discards or transmits the packet. When discarding the packet, the transmission wait control unit 36 releases a relevant packet on the memory 16, and subsequently once again returns to the operation for judging whether packets are present or not. When transmitting the packet, the address thereof is notified to the radio transmitting unit 17. The radio transmitting unit 17 transmits a packet in the memory 16 identifiable by the notified address to the first base station 27 via the wireless communication channel and, once the transmission is complete, releases a relevant packet on the memory 16.

Even when this operation is in progress, a new voice packet can be generated and inputted to the transmission wait control unit 36. This packet is to be linked to the queue 19 in accordance with the operation described above. Since the speed at which an old packet is extracted is greater than the speed at which a new packet is linked to the queue 19, the queue 19 decreases swiftly and eventually becomes empty.

Stored in advance in the array r is a value designed so that the smaller the counter i, the higher the discard rate, and the larger the counter i, the lower the discard rate. However, the discard rate is not to exceed 1/2. It is a feature of the present invention that the number k of such packets are to be designed as follows.

If reference character L denotes the maximum length of the queue 19 corresponding to the threshold Tw and that one packet is to be discarded for every k number of packets transmitted, the number k is to be varied within the range of $1 \leq k \leq L$. The number k is initially set to 1 and is varied, as the counter i increases, so as to equal or exceed the counter i. An example of the array r created in this manner is shown in FIG. 8.

FIG. 8 is an explanatory diagram showing, using a table, the relationship between the reference value r[i] of an array with respect to the counter i and the number of packets k. The basis of FIG. 8 is that if the number J of the packets accumulated by the jitter absorbing buffer unit 21 within the predetermined accumulation time Tj equals 7, the number k is set to 2, whereby one in every three packets are to be discarded. Since the playback time corresponding to three voice frames is to be realized by two frames, this is equivalent to an increase in transmission speed by a factor of 3/2. However, actual packets are transmitted at the original intervals of the voice frame period. In this case, when playback of a total of W=21 voice frames is completed, the jitter absorbing buffer unit 21 restores the predetermined accumulated number J=7 and returns to a steady state, Therefore, the array r shown in FIG. 8 has values corresponding to 21 voice frames, and among them, seven voice frames are to be discarded.

Since packets corresponding to those discarded are to be extrapolated, it is unfavorable to set the discard rate greater than 1/2. In addition, voice quality is enhanced by preferably setting the discard rate lower than 1/2. Generally, if one packet is discarded for every k number of packets transmission and reference character n denotes the transmission speed improvement ratio, then the following formula is valid.

$$n = (k+1)/k \qquad (2)$$

Since a total of W number of packets are transmitted at n times the speed while the W number of packets are replayed and, further, the accumulation of a predetermined accumulated number I of packets is achieved, the following formula is valid.

$$W/n + J = W \qquad (3)$$
$$\therefore W = J/(1-(1/n))$$
$$\therefore W = J \times (k+1)$$

As shown, while voice quality is enhanced by lowering the discard rate and increasing the number of packets k, the total number of packets W to be transmitted until the jitter absorbing buffer unit 21 recovers and returns to a steady state increases.

Figure 9:
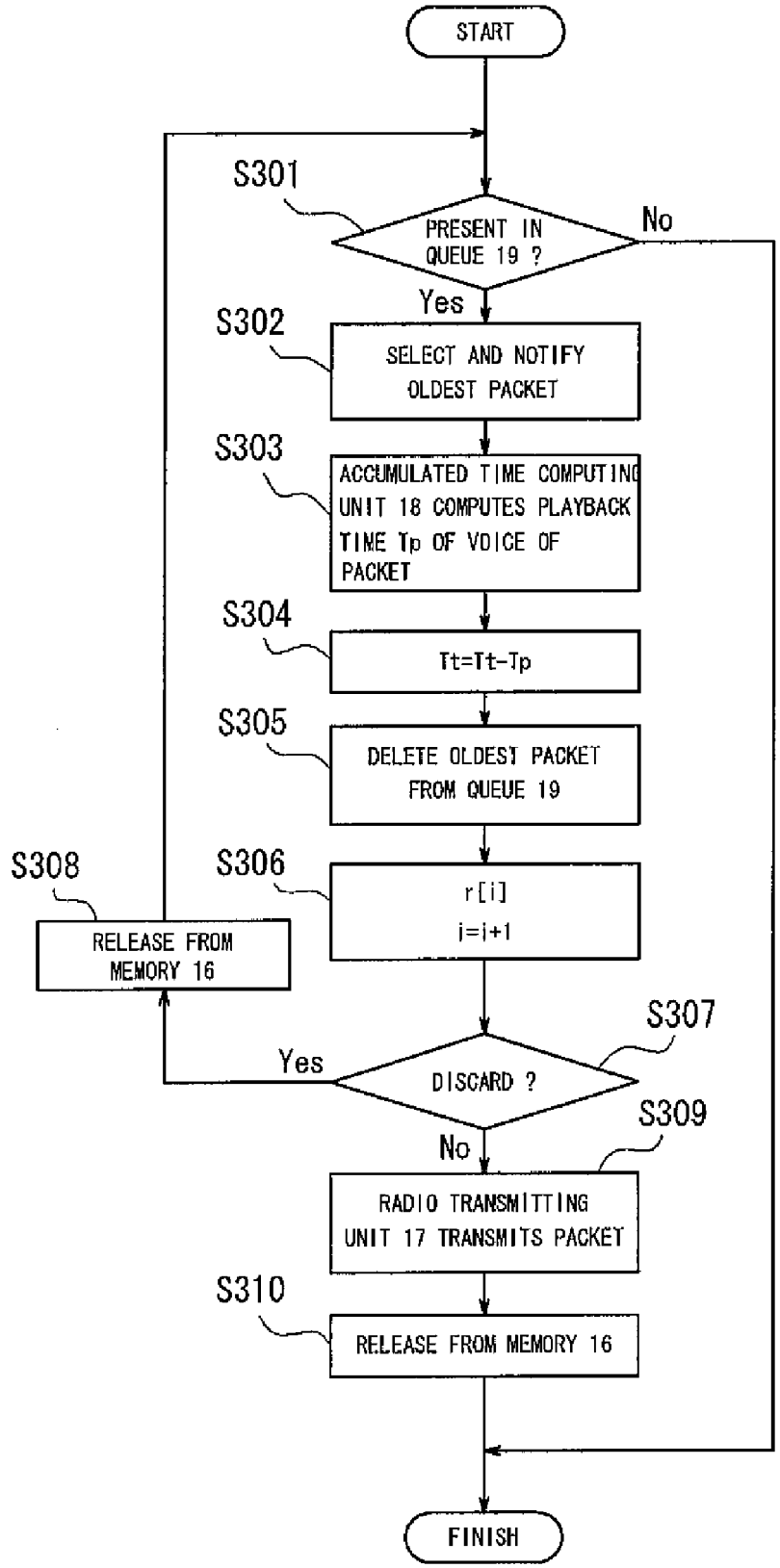
FIG. 9 is a flowchart showing a procedure of processing repetitively performed by a transmission wait control unit upon receiving a timing of a voice frame period of an encoder according to the second embodiment.

FIG. 9 is a flowchart showing a procedure of processing repetitively performed by the transmission wait control unit upon receiving a timing of a voice frame period of the encoder according to the second embodiment. As shown in FIG. 9, first, a judgment is made on whether packets are present in the queue 19 or not (step S301). In other words, the transmission wait control unit 36 judges whether or not linked packets are present in the queue 19.

When the judgment reveals that there are linked packets (a "yes" result), the oldest packet is selected and notified (step S302). After selecting and notifying the oldest packet, the transmission wait control unit 36 selects a packet whose order is the oldest among the queue 19, and notifies the accumulated time computing unit 18 that the packet is to be deleted from the queue 19.

On the other hand, when the judgment reveals that there are no packets (a "no" result), the processing is terminated.

Next, the accumulated time computing unit 18 computes the playback time Tp of voice of the notified packet (step S303), and subsequently, the accumulated time computing unit 18 subtracts the playback time Tp from the accumulated time Tt (Tt=Tt−Tp) (step S304).

The oldest packet is then deleted from the queue 19 (step S305). In other words, the transmission wait control unit 36 deletes the address of a relevant packet from the queue 19.

Subsequently, if a variable i denotes the value of the counter 38 and a reference character r denotes the array 23, the discard judging unit 37 references an array value r[i] whose index is i, and uses the same as a judgment result (step S306). Furthermore, the discard judging unit 37 increments the counter 38 by one.

Next, the discard judging unit 37 judges whether to discard the packet or not (step S307). When it is judged that the packet is to be discarded (a "yes" result), the transmission wait control unit 36 releases a relevant packet on the memory 16 (step S308) and subsequently returns to step 5301.

On the other hand, when it is judged that the packet is not to be discarded (a "no" result), the transmission wait control unit 36 notifies the address to the radio transmitting unit 17, and the radio transmitting unit 17 transmits a packet in the memory 16 identifiable by the notified address to the first base station 27 via the wireless communication channel (step S309). Once transmission is complete, the radio transmitting unit 17 releases a relevant packet on the memory 16 (step S310), and subsequently terminates processing.

As shown, since the processing described above is repetitively executed at the voice frame period of the encoder 13, the length of the queue 19 decreases more gradually in comparison to the case of processing to be executed when the radio transmitting unit changes from an untransmittable state to a transmittable state (refer to FIG. 5).

Figure 10:
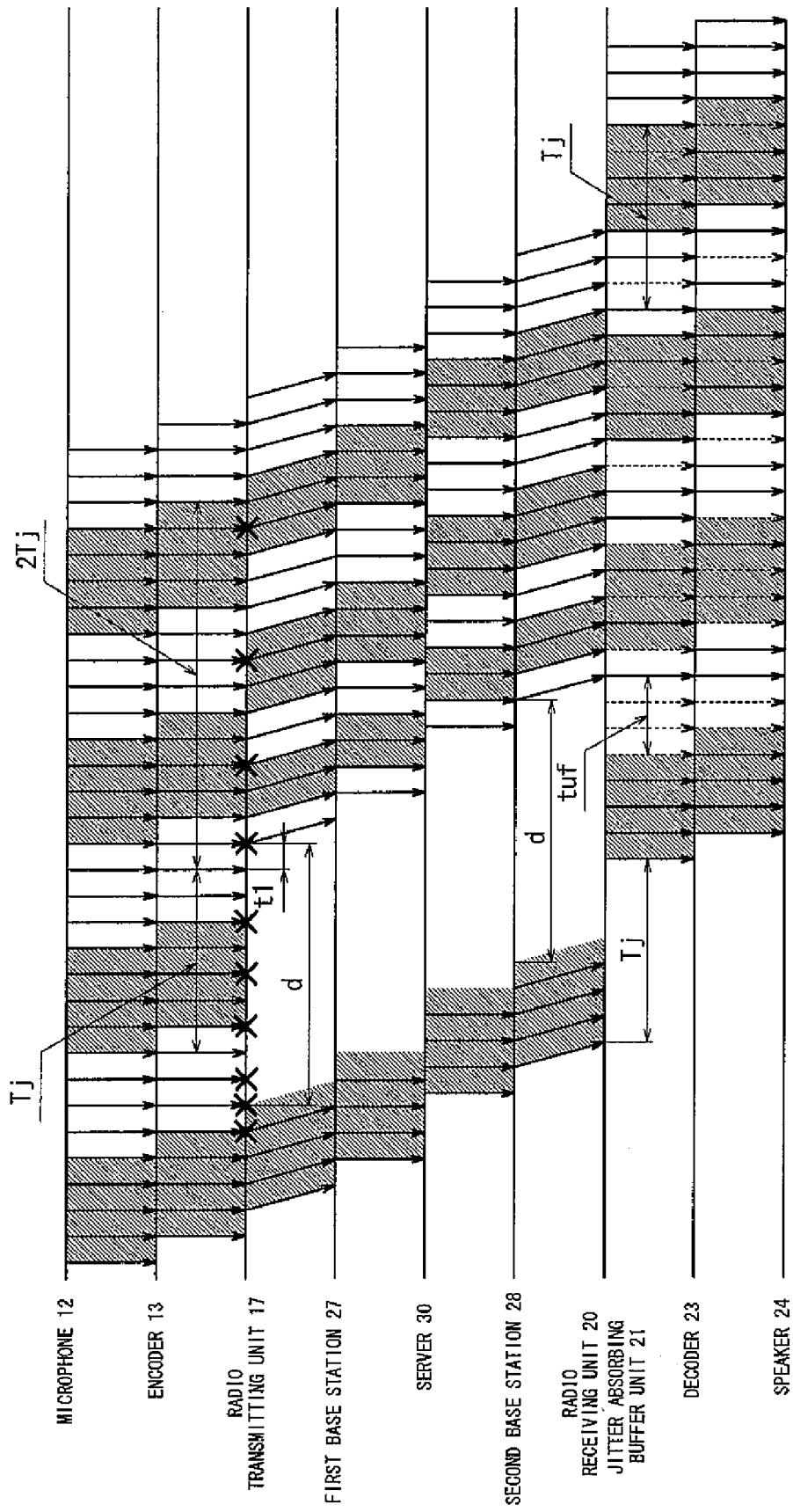
FIG. 10 is an explanatory diagram showing the behavior of voice frames or packets transmitted through respective parts or apparatuses according to the second embodiment.

FIG. 10 is an explanatory diagram showing the behavior of voice frames or packets transmitted through the respective parts or apparatuses according to the second embodiment. In the drawing, the abscissa represents time and the arrows represent the behavior of voice frames and packets storing voice frames transmitted from top to bottom. One arrow represents one voice frame or one packet and, for the sake of clarity of the diagram, hatchings have been applied every four arrows. However, it should be noted that the hatchings are only for convenience and do not represent differences in data types or functions.

In FIG. 10, unlike in FIG. 6, since the radio transmitting unit 17 transmits packet at the same intervals as the voice frame period, the server 30 or other communication apparatuses are not subjected to spike loads. In addition, the number of packets to be transmitted from the radio transmitting unit 17 is reduced due to discarding in accordance with the discard judging unit 37. In the drawing, the packets to be discarded are represented by x.

With the discard rate using 1/3 as a basis, FIG. 10 shows a case where k varies from 1 to 4. In this case, the operations shown in FIG. 10 start from a situation in which voice transmission is at a steady state. In a steady state, packets corresponding to the predetermined accumulation time Tj or, in other words, J number of packets are stored in the jitter absorbing buffer unit 21. The drawing shows a situation where four packets arrive at the jitter absorbing buffer unit 21 after being subjected to a standard delay set in the steady state. Four voice frames are replayed after being subjected to a delay of the predetermined accumulation time Tj at the jitter absorbing buffer unit 21.

Subsequently, the wireless communication channel between the radio transmitting unit 17 and the first base station 27 degrades, whereby transmission breaks down over a time d, where d is 10 times the voice packet period. When the radio transmitting unit 17 enters an untransmittable state, the transmission wait control unit 36 commences accumulation. While voice packets are being continuously generated even during the breakdown period d, only packets corresponding to the predetermined accumulation time Tj or, in other words, J=7 packets are stored in the queue 19 of the transmission wait control unit 36.

Although the radio transmitting unit 17 recommences transmission after the lapse of the time d and upon recovery of the wireless communication channel, the lapse of a delay time t1 (in this case, assumed to be one voice frame period) is required. As such, transmission is recommenced after the lapse of t1 or more.

Upon recommencement of transmission, the transmission wait control unit 36 repetitively performs operations according to an externally-supplied voice frame period. A packet linked to the queue 19 is extracted, and the discard judging unit 37 judges whether the packet is to be discarded or transmitted. When the packet is discarded, the transmission wait control unit 36 once more extracts a next packet in the queue 19 and repeats operations.

The time d during which communication breaks down exceeds the predetermined accumulation time Tj of the jitter absorbing buffer unit 21 by three frames. Therefore, in FIG. 10, during the period of time denoted by time tuf or, in other words, during three frames, packets fail to arrive in time for the playback timing and an underflow occurs. During the occurrence of an underflow, packet interpolation is performed. As for a method of performing interpolation during an underflow, a previous frame is extrapolated while gradually reducing gain. In FIG. 10, this interpolation is represented by the dotted-line arrows.

In addition, packets arriving after the playback timing are discarded. Since packets arriving after the time tuf are in time for the playback timing, playback commences on the packets. However, since packets instructed by the discard judging unit 37 to be discarded are lost, interpolation is performed. In FIG. 10, this interpolation is represented by the dotted-line arrows. While packet loss occurs consecutively in the case of an underflow, the discard judging unit 37 instructs discarding so that packet loss does not occur consecutively.

In FIG. 10, since the transmission wait control unit 36 operates according to an externally-supplied voice frame period, packet intervals do not vary. Therefore, the accumulated amount of the jitter absorbing buffer unit 21 recovers gradually. Packets corresponding to the predetermined accumulation time Tj are achieved when the playback of W=3×J number of packets is completed. Subsequently, a steady state is restored.

Figure 11:
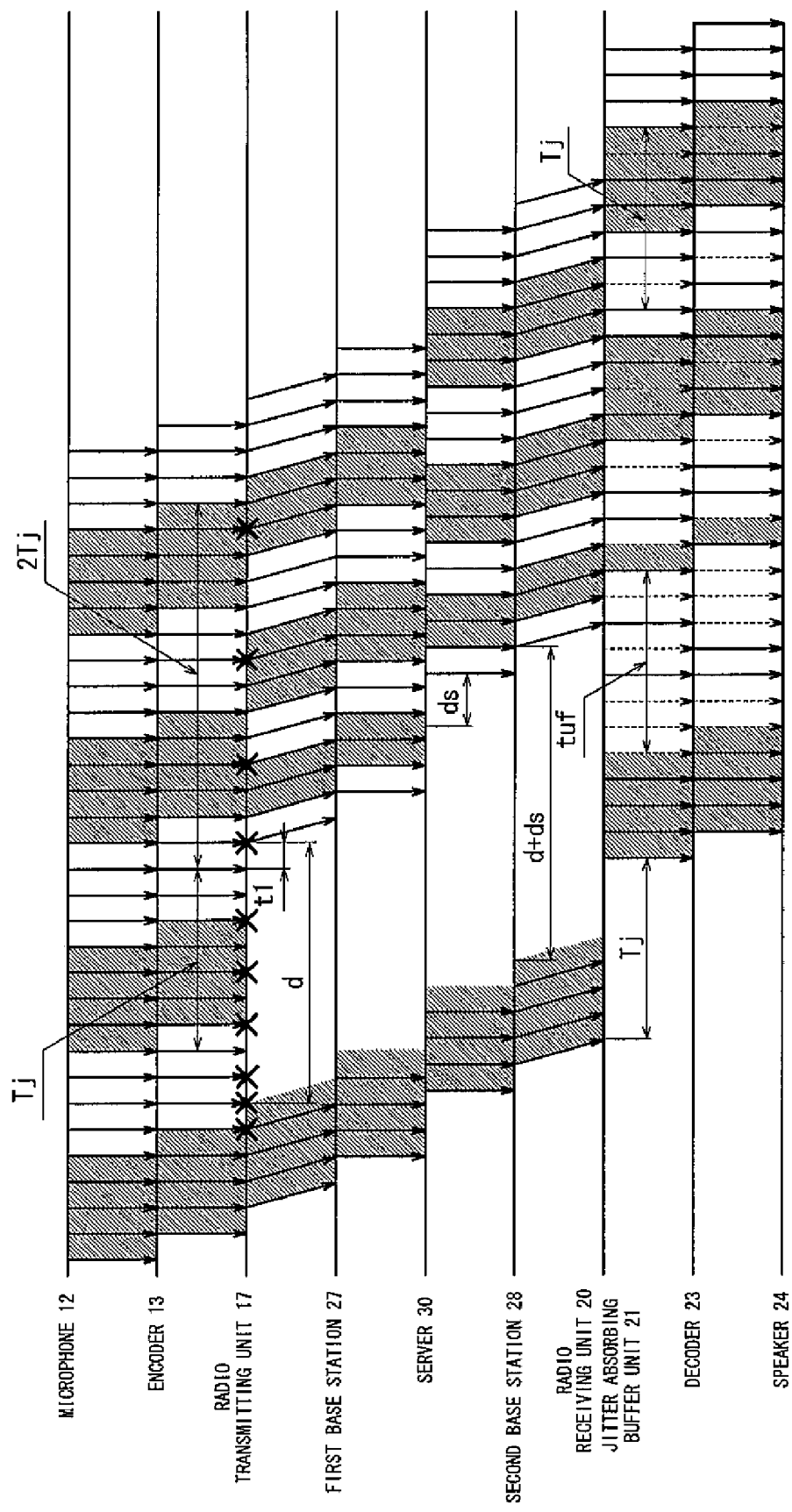
FIG. 11 is an explanatory diagram showing the behavior of voice frames or packets transmitted through the respective parts or apparatuses in the case where underflow recovery is further delayed due to downstream delay jitter according to the second embodiment.

FIG. 11 is an explanatory diagram showing the behavior of voice frames or packets transmitted through the respective parts or apparatuses in the case where underflow recovery is further delayed due to downstream delay jitter according to the second embodiment.

FIG. 11 shows a situation where a server 30 performing processing at 2.5 times the normal voice packet period or, in other words, 50 ms, is further subjected to a delay of ds, where the delay ds is twice the normal voice packet period or, in other words, 40 ms. Delayed packets arriving at the jitter absorbing buffer unit 21 of the receiving unit 11 are not in time for the playback timing and are therefore discarded. Instead, packets are interpolated and a loss time tuf due to underflow has increased. While the time tuf had been three times the voice packet period in FIG. 6, the time tuf is seven times the same in FIG. 11. A time that is twice the applied delay ds has been added to the loss time tuf.

As shown, a low-quality segment with a high discard rate underflows while a high-quality segment with a low discard rate is replayed, resulting in an earlier playback commencement time upon occurrence of a jitter. In other words, a burst loss has been converted into a random loss.

The present embodiment is capable of suppressing an increase in the loss time tuf due to an underflow. This is made possible by having the discard judging unit 37 increase the discard rate of old packets. For comparison, a case where the discard rate is fixed to one in every three or, in other words, k=2, is shown in FIG. 12.

Figure 12:
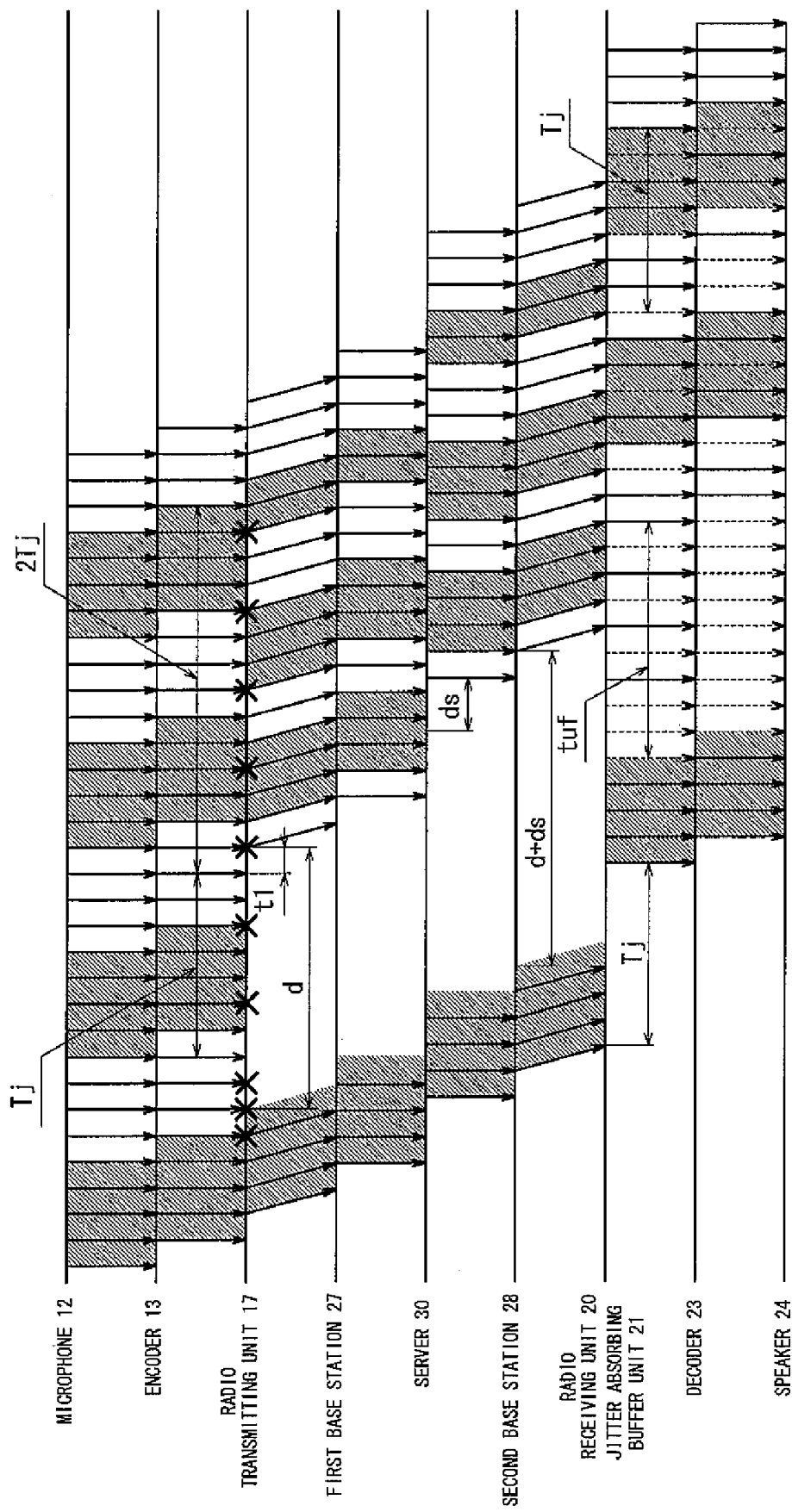
FIG. 12 is an explanatory diagram showing, for comparison with FIG. 11, the behavior of voice frames or packets transmitted through the respective parts or apparatuses when a discard rate is fixed at one every three packets.
Figure 13:
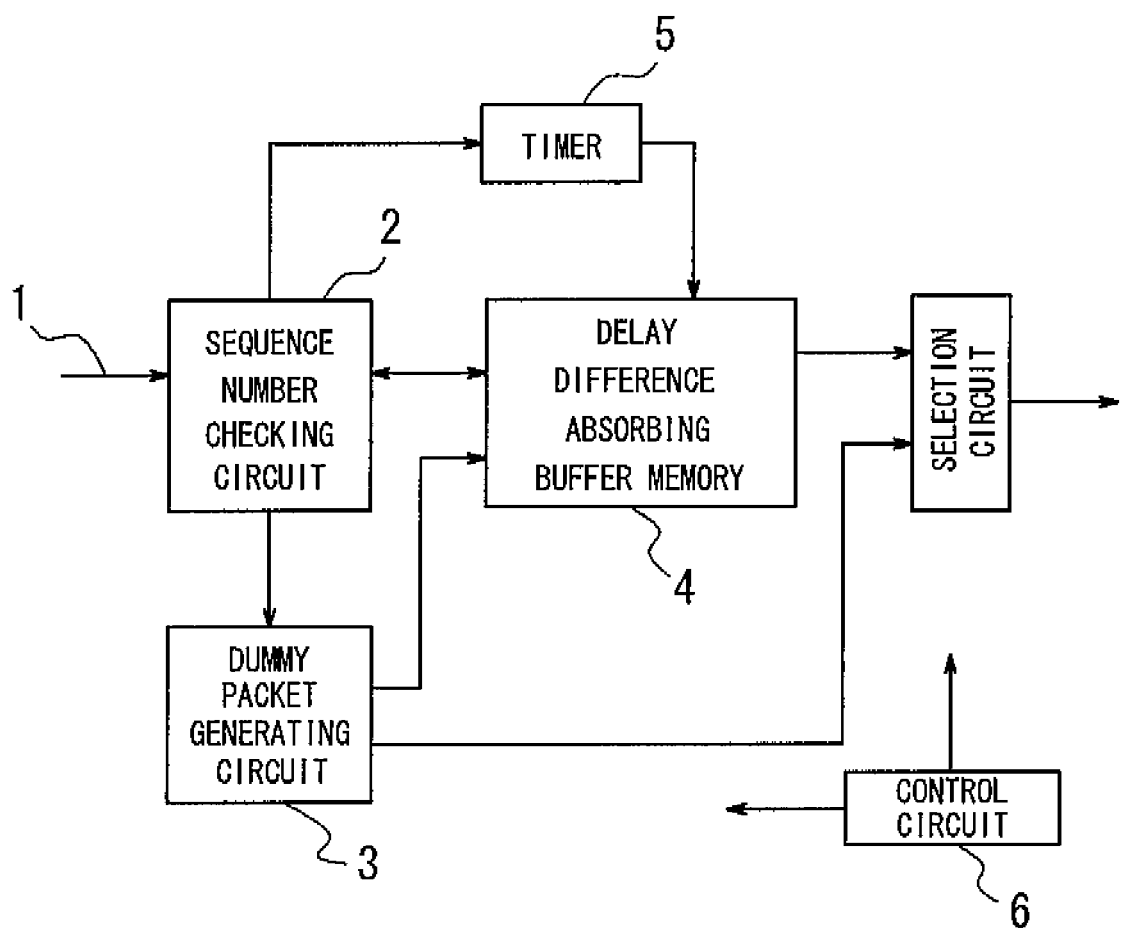
FIG. 13 is a block diagram illustrating a conventional packet-switching scheme.
Figure 14:
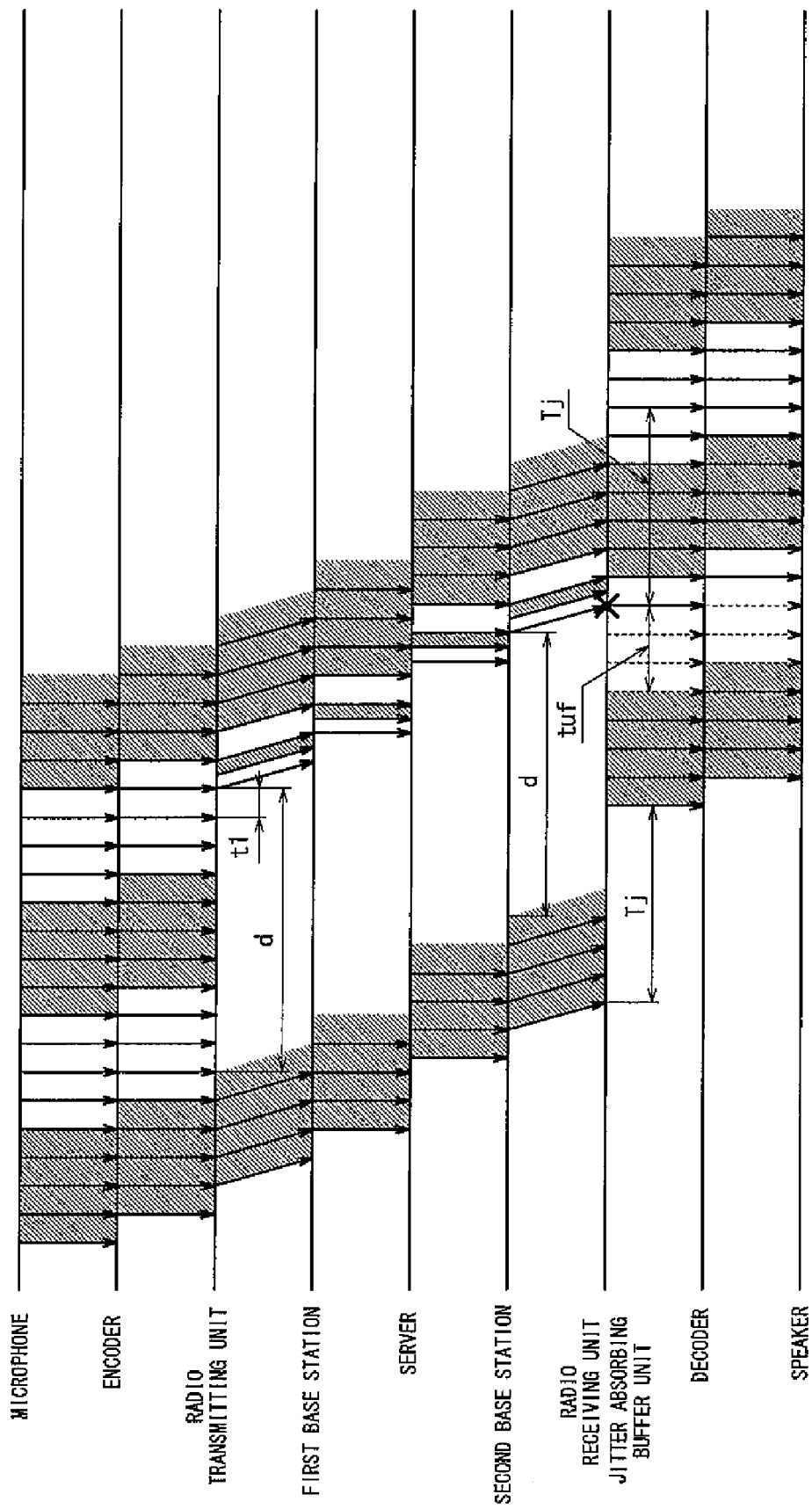
FIG. 14 is an explanatory diagram showing the behavior of voice frames or packets transmitted through respective parts or apparatuses in conventional art.

FIG. 12 is an explanatory diagram showing, for comparison with FIG. 11, the behavior of voice frames or packets transmitted through the respective parts or apparatuses when the discard rate is fixed to one in every three packets. In FIG. 12, the loss time tuf is nine times the voice packet period, and a time that is three times the applied delay ds has been added to the loss time tuf. This is because the greater the number k, the later the arrival time of packets and more time is required until the difference between the playback timing and the arrival time widens.

Therefore, as shown in FIG. 11, the present embodiment is capable of commencing playback early and reducing the discard rate of portions to be replayed in order to improve voice quality even when a jitter occurs in the downstream communication channel and delay increases. In other words, the present embodiment combines early playback commencement and favorable voice quality.

As shown, according to the present invention, the following effects and advantages may be achieved.

First, since packets not replayed are not transmitted, wasteful discarding can be avoided, thereby eliminating the need for providing communication infrastructure that end up being unused.

In addition, since transmission commences with packets corresponding to a predetermined accumulated time of a jitter absorbing buffer upon communication recommencement even in the case where transmission is disabled to the extent that underflow occurs in the jitter absorbing buffer, congestion and increases in the load on a server can be alleviated in comparison with conventional examples in which all delayed packets are transmitted. Furthermore, compared to conventional examples provided with QoS in which delayed voice packets are discarded, since a recovery of the jitter absorbing buffer can be achieved even when playback is commenced at an earlier point in time, a breakdown period can be reduced.

Moreover, it is now possible to either prevent an increase in the spike load that acts on a communication apparatus or a server on a communication channel or control load increase to within a certain rate.

Furthermore, even when the downstream communication channel fluctuates and delay increases, an improvement can be made so as to satisfy demands for both early playback commencement and favorable voice quality.

While the present invention has been described with reference to the specific embodiments above, it should be understood that the present invention is not limited thereto. Accordingly, various modifications may be made without departing from the true spirit and scope of the present invention.

CROSS REFERENCE TO RELATED APPLICATION

The present application is a national stage of International Application No. PCT/JP2007/068883 (filed on Sep. 27, 2007), and is based upon and claims the benefit of priority from Japanese Patent Application No. 2006-264847 (filed on Sep. 28, 2006), the entire contents of which are incorporated herein by reference.

What is claimed is:

1. A voice transmission apparatus characterized by comprising:
   a transmitting unit that transmits packets storing voice data to a packet-switching network;
   a receiving unit that receives the packets from the packet-switching network;
   a jitter absorbing buffer unit provided in the receiving unit and which absorbs a transmission delay in the packets; and
   a transmission wait control unit provided in the transmitting unit and which links packets to be transmitted when transmission temporarily breaks down to a queue, wherein
   the transmission wait control unit is provided with an accumulated time computing unit that computes an accumulated time of the voice data in the packets linked to the queue,
   the transmission wait control unit extracts an oldest linked packet from the queue and discards the same so that the accumulated time computed by the accumulated time computing unit becomes equal to or less than a threshold in order to continuously link new packets to the queue,
   thereby equalizing the threshold to an accumulation time of the jitter absorbing buffer unit.

2. The voice transmission apparatus according to claim 1, characterized in that
   the receiving unit notifies the transmission wait control unit of the accumulation time of the jitter absorbing buffer unit, and
   the transmission wait control unit updates the threshold with the notified accumulation time.

3. The voice transmission apparatus according to claim 1, characterized in that:
   the transmission wait control unit is provided with a discard judging unit that judges whether the packets linked to the queue are to be discarded or not and performs discarding according to a judgment by the discard judging unit; and
   the discard judging unit performs judgment so as to vary the number of packets k within a range of $1 \leq k \leq L$ if reference character L denotes the maximum length of the queue and that packets are assumed to be discarded at a rate of one packet per k number of packets transmission, and the longer the accumulated time computed by the accumulated time computing unit, the smaller the number of packets k, while the shorter the accumulated time, the larger the number of packets k.

* * * * *